(12) United States Patent
Sniegowski et al.

(10) Patent No.: US 6,363,712 B1
(45) Date of Patent: Apr. 2, 2002

(54) GAS-DRIVEN MICROTURBINE

(75) Inventors: Jeffrey J. Sniegowski; Murray S. Rodgers; Paul J. McWhorter, all of Albuquerque; Daniel P. Aeschliman, Cedar Crest; William M. Miller, Tijeras, all of NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/516,600

(22) Filed: Jul. 14, 1999

Related U.S. Application Data

(63) Continuation-in-part of application No. 08/773,148, filed on Dec. 30, 1996, now abandoned.
(60) Provisional application No. 60/023,659, filed on Jun. 27, 1996.

(51) Int. Cl.[7] .............................. H02N 1/00; F02C 3/10
(52) U.S. Cl. ..................... 60/39.75; 60/462; 310/309; 216/17; 216/66; 216/101
(58) Field of Search .................. 60/39.75, 39.462; 310/309; 216/17, 66, 101

(56) References Cited

U.S. PATENT DOCUMENTS

| | | | |
|---|---|---|---|
| 5,043,043 A | 8/1991 | Howe et al. | 186/645 |
| 5,130,276 A | 7/1992 | Adams et al. | 437/225 |
| 5,252,881 A | 10/1993 | Muller et al. | 310/309 |
| 5,262,695 A | 11/1993 | Kuwano et al. | 310/309 |
| 5,366,587 A | 11/1994 | Ueda et al. | 216/2 |
| 5,378,583 A | 1/1995 | Guckel et al. | 430/325 |
| 5,631,514 A | 5/1997 | Garcia et al. | 310/309 |
| 5,874,798 A * | 2/1999 | Wiegele | 310/168 |

OTHER PUBLICATIONS

H. Nathanson et al., "The Resonant Gate Resistor," *IEEE Trans. :Electron Devices*, vol ED–14, No. 3, pp. 117–133, Mar. 1967.
R. Howe et al., "Polycrystalline Silicon Micromechanical Beams," *J. Electrochem. Soc.: Solid–State Science and Technology*, vol. 130, No. 6, pp. 1420–1423, Jun. 1983.
J. Sniegowski et al., "Microfabricated Actuators and Their Applications to Optics," *Proc. SPIE Miniaturized Systems with Micro–Optics and Micromachines*, No. 2383, pp. 46–64, 1995.
E. Garcia et al., "Surface Miromachined Microengine," *Sensors and Actuators A*, 48 (1995), pp. 203–214.
W. Tang et al., "Laterally Driven Polysilicon Resonant Microstructures," *Sensors and Actuators*, 20 (1989), pp. 25–32.
R. Howe, "Surface Micromachining for Microsensors and Microactuators," J. Vac. Sci. Technol. B, vol. 6, No. 6, pp. 1809–1813, Nov./Dec. 1988.
W. Ehrfeld et al., "LIGA Process: Sensor Construction Techniques Via X–Ray Lithography," *Rec. of the IEEE Solid–State Sensor and Actuator Workshop*, pp. 1–4, 1988.

* cited by examiner

*Primary Examiner*—Charles G. Freay
*Assistant Examiner*—Ehud Gartenberg
(74) *Attorney, Agent, or Firm*—Dickson G. Kehl; James C. Durkis; Virginia B. Caress

(57) ABSTRACT

A microturbine fabricated by a three-level semiconductor batch-fabrication process based on polysilicon surface-micromachining. The microturbine comprises microelectromechanical elements formed from three polysilicon multi-layer surfaces applied to a silicon substrate. Interleaving sacrificial oxide layers provides electrical and physical isolation, and selective etching of both the sacrificial layers and the polysilicon layers allows formation of individual mechanical and electrical elements as well as the required space for necessary movement of rotating turbine parts and linear elements.

17 Claims, 15 Drawing Sheets

GAS-DRIVEN MICROTURBINE

CROSS REFERENCE TO RELATED APPLICATIONS

This is a continuation-in-part of application Ser. No. 08/773,148, filed Dec. 30, 1996, now abandoned, which claims benefit of Provision No. 60/023,659 filed Jun. 27, 1996.

GOVERNMENT RIGHTS

The present invention was conceived and developed in the performance of a U.S. Government Contract. The U.S. government has certain rights in this invention pursuant to contract No. DE-AC04-94AL85000 between the U.S. Department of Energy and Sandia Corporation.

FIELD OF THE INVENTION

The present invention relates generally to microtechnology and the fabrication process for developing micromechanical and microelectrical systems such as micro-actuated elements, microengines, or micromachines. More particularly, the present invention is directed to a means of fabricating a gas-driven microturbine that is capable of providing autonomous propulsion in which the rapidly moving gases are directed through a micromachined turbine to power mechanical, electrical, or electromechanical devices by direct mechanical linkage of turbo-electric generator components in a domain ranging from tenths of micrometers to thousands of micrometers. By optimally selecting monopropellants or bipropellants to be the fuel set, a more efficient gas-driven microturbine can be realized from the increased mass flow rate of the gas stream due to the higher combustion reaction energies of these fuel sets. Additionally, compressed gas can be utilized to provide a high-flow gas stream for the gas-driven microturbine. The present invention is adaptable to many defense and non-defense applications, including the provision of mechanical power for miniature devices such as fans, geared mechanisms, mechanical linkages, actuators, biomedical procedures, manufacturing, industrial, aviation, computers, safety systems, and electrical generators.

BACKGROUND OF THE INVENTION

In the last decade, great interest has developed in the emerging field of microtechnology. Microminiature machines (micromachines) represent an emerging technology with significant national and international interest. Generally, these micromachines comprise the larger class of components usually referred to as microelectromechanical systems (MEMS) that are fabricated using now-standard semiconductor manufacturing techniques. The systems are integrated microdevices combining electrical and mechanical components fabricated using integrated-circuit-compatible batch-processing techniques and range in size from micrometers to millimeters. The inherent motivation for developing MEMS is the ability to perform specialized applications through smaller, faster, lighter, and more accurate micromechanical devices. These systems can control, sense, and actuate on the microscale and function individually or in arrays to generate effects on the macroscale.

The area of micromechanics deals with actuators and sensors which are on the order of micrometers. This ability results in applications which take advantage of potentially high packing densities for simple microdevices which, when combined in a system, can perform complex and precise mechanical and electrical functions. Another important aspect is found in micropositioning applications since these microdevices can be moved by small distances which can be measured or monitored accurately. Micromechanical devices are significant because they can have small moments of inertia, but they are currently limited in their abilities to generate adequate output forces and torques for specialized applications. However, the result of extensive research in micromechanics and advances in polysilicon surface-micromachining have led to the development of microscopic motors of considerably low-mass, incorporating mechanisms on silicon wafers for -a number of technological applications such as micro-sensors to detect or measure changes in pressure, acceleration, temperature, vapor, or sound. Micromechanical technology can be incorporated into automobiles to diagnose and sense engine-performance or into applications involving the deployment of air bags or into sensors that can detect air pressure in tires.

One of the earliest devices fabricated from the surface-micromachining process was a device called the resonant gate resistor. This device was disclosed in an article written by Nathanson, et al., entitled, "The Resonant Gate Resistor," IEEE, Trans. Electron Devices, Vol. ED-14, pp. 117–133, March 1967. The device consisted of a transistor with a free-standing metal cantilever beam serving as the transistor gate. Subsequent work in this area led to the development of a polysilicon surface-micromachining technique described in an article by Howe, et al., entitled, "Polycrystalline Silicon Micromechanical Beams," J. Electrochem. Soc.: Solid-State Science and Technology, Vol. 103, No. 6, pp. 1420–1423, June 1983.

Working with methods of producing microelectric circuitry but optimized for producing micromechanical devices, the polysilicon surface-micromachining process generally involves etching a pattern in films supported by a silicon substrate by exposing the polysilicon through a photoresist mask. By selectively etching sacrificial layers from a multilayer sandwich of patterned polysilicon films and interleaved sacrificial oxide films and through material deposition and selective removal of these various film layers, highly specialized and unique components can be structurally fabricated. The basic process involves fabricating a single layer of mechanical polysilicon to form simple micromechanical devices. However, with just one layer of polysilicon, the mechanical structures have restricted movement through elastic members attached to the substrate and provide limited mechanical movement. Therefore, the need to fabricate more sophisticated and specialized structures necessitates the deposition of multiple layers of polysilicon to form complex mechanical structures such as sliders and self-restraining pin joints. With two layers of polysilicon deposition, it is possible to fabricate rotating entities, but the ability to harness the rotary motion produced from a gear or turbine is limited; that is, there needs to be a means to fully couple the energy produced from mechanical devices formed from a two-layer polysilicon deposition. To address this problem, a third layer of poly silicon deposition would allow a gear or turbine formed from a two-layer polysilicon deposition to be interconnected by a mechanical linkage for direct actuation of ancillary components. A discussion of the polysilicon surface-micromachining batch-fabrication process is discussed in greater detail in the articles given by J. J. Sniegowski, et al., "Microfabricated Actuators and Their Application to Optics," Proc. SPIE Miniaturized Systems with Micro-Optics and Micromachines, 2383, San Jose, Calif. 1995, pp. 46–64; and E. J. Garcia, et al., "Surface Micromachines Microengine," Sensors and Actuators A, 48 (1995), pp. 203–214.

The small sizes of the micromotors and recent advances in polysiliconsurface-micromachining combine to exhibit unique and novel electromechanical characteristics that are vastly different from conventional motors. Electrostatic forces in the microdomain are found to scale more favorably than the magnetic alternatives for devices designed to micro-dimensions and the use of micro-size field-generating structures enables more intense electrostatic fields to be created. Conventional motors are typically magnetically driven but he windings and magnetizable material to make such motors make it nearly impossible to duplicate or produce on the silicon chips in the microdomain due to the inherent size limitations.

U.S. Pat. No. 5,262,695 (Kuwano et al.) discloses two possible drive systems (wired and wireless) for a micromachine. A wired system has the energy source located outside the micromachine unit. This setup allows for the ability to produce smaller machines with the drive energy supplied through a feed cable. However, the cable imposes movement and control limitations on the operation of the machine. In the case of the wireless system, machine movement is less restricted since the energy source is generally mounted on the machine but this setup increases the size and weight of the entire micromachine and impairs the contemplated function(s) of the micromachine. Kuwano proposes an electrostatic motor for use as a mechanical power generating mechanism to be mounted on a micromachine that includes a rotatable semiconductor substrate and a drive electrode disposed in proximity to the substrate. Kuwano's invention consists of an electrostatic motor comprising a rotor and a stator fabricated from silicon or a similar semiconductor. The semiconductor substrate is doped with a specified impurity element to form electromagnetic wave-static electric converters of p-n junction. To drive the micromotor, positive and negative voltages are applied to two stator poles while the remaining stators in the machine unit are grounded or put at zero electrical potential. The positive and negative stator voltages induce opposing charges on the rotor poles nearest the stator poles, and, as the voltages are continuously alternated between the stators that are located 180 degrees apart and those that are at zero potential and the rotors, the rotor begins to spin.

U.S. Pat. No. 5,252,881 (Muller et al.) discloses a method for making a microminiature electrical motor having a rotor rotatable about a fixed hub member within a surrounding stator. In particular, the fabrication of the micromotors begins with providing a substrate material with a first layer of silicon dioxide covered by a layer of silicon nitride. Next, a first layer of sacrificial material is provided on said substrate. The first structural layer over said sacrificial material is then realized by patterning and then etching said first structural layer to form the rotor and stator components. A second layer of sacrificial material is then deposited over the first structural layer in which the pattern set involves the formation of an anchor opening in the substrate at the center of the rotor. To form the hub member in said anchor opening, a second structural layer is patterned to form a flange for said hub member. The sacrificial layers are etched to separate the rotor and stator components, as well as the rotor from the hub member, so that the rotor rotates about the hub member. The invention also includes an ancillary method for protecting metallized elements in the motor circuit during the required etching steps for removal of sacrificial layers.

U.S. Pat. No. 5,043,043 (Howe et al.) discloses an electrostatic micromotor that employs a side drive design. In particular, three fabrication processes enable the formation of a moveable member in the plane of operation of the stator and spaced apart from the stator by a micron amount. The first fabrication process deposits and patterns a structural layer to form the stator and moveable member over a sacrificial layer. The second fabrication process etches channels in a first structural layer to outline a stator, a moveable member, and if desired, a bearing. A substrate is then connected to the side of the structural layer through which the channels are etched, and the opposite side is ground down to the ends of the channels to form salient stator, rotor and, if desired, bearing structure. The third fabrication process grows a sacrificial layer by local oxidation in an etched cavity of the substrate. A structural layer is then deposited and patterned over the substrate and sacrificial layer to form the stator and moveable member in a common plane.

The inventions of Kuwano, Muller, and Howe are limited in the sense that, because of the electrostatic motor design and configuration, it is difficult to direct the rotary motion produced by the rotors to drive a mechanical component or entity such as a diaphragm, slider, spring, cantilevered beam, or gear. Other problems associated with a typical drive system for an electrostatic motor include: (1) the need to incorporate complex integrated circuitry to withstand a high voltage supply (typically 100 V) to produce the rotary motion from the rotor and stator combination, (2) the need to minimize frictional losses without compromising rotor-torque characteristics, and (3) the need to increase the operating range and movement of the machine unit. Therefore, to overcome these existing limitations of the wire and wireless drivers for these micromachine systems, it is the object of the present invention to fulfill the need to find a less complicated and more practical alternative to autonomously power micromechanical and electromechanical systems. The need for an autonomous generator system has only been addressed with cursory ideas as to how to accomplish it and no attempt thus far has been made to reduce such a system to practice. Furthermore, most of the effort in micromachining technology thus far has been in the development of microscale sensors and not in the creation of an autonomous power system. The size of the sensors or actuators can become irrelevant if they are subject to power supplies of six orders of magnitude larger or more.

In view of the above-described needs and to overcome the shortcomings of the prior art, it is an object of the present invention to provide a gas-driven microturbine and a method for fabricating a gas-driven microturbine on a silicon substrate base.

It is another object of the present invention that the entire gas-driven microturbine is made primarily of polysilicon with intervening coatings of silicon nitride for electrical isolation on a single substrate using a three-layer polysilicon surface-micromachining batch-fabrication process.

It is still another object of the present invention that the gas-driven microturbine comprises a core propulsion system with a plurality of components including the holding tank, fuel set, fuel delivery system, reaction chamber, flow channel, turbine housing, turbine, turbine shroud, exhaust port, and mechanical linkage arm, all of which are fabricated using polysilicon surface-micromachining techniques on a silicon substrate.

It is still a further object of the invention that the components of the propulsion system do not result from an assembly of separately fabricated individual parts, but are fully batch-fabricated.

It is still another object of the invention that the fabrication of the core propulsion system of the gas-driven microturbine requires four depositions of polysilicon in which the first layer of polysilicon serves as the voltage reference plane and the electrical interconnect while the three remaining polysilicon layers serve to form the mechanical and structural elements of the propulsion system.

It is still even a further object of the invention that the thermal assist elements comprise a plurality of polysilicon filaments that are located internally within the reaction chamber, wherein the reaction chamber is fabricated with at least one inlet tube to provide a delivery system for transporting the fuel set from the holding tank to the reaction chamber by capillary action, pressure feed, or mechanical pump.

It is another object of the present invention that the reaction chamber can be configured to include a pre-heater element for initiating thermal decomposition of a fuel set or to provide a continuous source of heat if water is selected as the primary source for generating a high-flow gas stream.

It is yet another object of the invention that the thermal assist elements are heated from an external power source through the voltage reference plane of the present invention.

It is a further object of the present invention that the central flanged hub and hub anchor for the turbine are formed from the second deposition of polysilicon and oxide and that the mechanical linkage arm is formed from the deposition of all three mechanical polysilicon films.

It is still a further object of the invention that post-deposition anneals are performed after the second structural and third structural polysilicon depositions to ensure that the polysilicon mechanical films do not exhibit undesired internal stress which would cause deformation of the final structural layer.

It is a final object of the present invention that the entire gas-driven microturbine assembly is subject to a hydrofluoric acid dip to release the free-standing components of the gas-driven microturbine.

Other objects, advantages and features of the invention will become apparent from the following detailed disclosure of embodiments thereof, presented in conjunction with the accompanying drawings.

SUMMARY OF THE INVENTION

The present invention comprises a gas-driven microturbine capable of micropropulsion to autonomously power miniature systems such as a turbine for effectuating mechanical loads by mechanically linking the turbine to an actuated element to generate power in the microdomain. Depending upon the particular application, the fuel set of the present invention is capable of generating large volumes of gaseous products or heat where the gas stream is routed through a flow channel and enters directly into a turbine housing. Applications requiring higher mass flow rates can utilize liquid agents such as conventional monopropellants (hydrogen peroxide or hydrazine) or bi-propellants to produce a more efficient gas-driven microturbine.

The invention further comprises a method for fabricating a gas-driven microturbine with a plurality of core propulsion elements utilizing a fuel set (steam, monopropellants, bipropellants, or compressed gas). In operation, the fuel set is injected into a holding tank, transported to a reaction chamber (by capillary action, mechanical pump, or pressure feed), and passed through at least one inlet tube (but typically multiple inlet pipes) which directs the generated large volume of gas and heat through a flow channel and across the turbine blades located within a turbine housing. The high flow gas stream entering the turbine shroud from the flow channel drives a turbine which acts on an element (hereinafter referred to as the actuated element) that is connected to the turbine by a mechanical linkage arm or direct gear coupling. Since the turbine entity is mechanically linked to the actuated element, the rotary motion of the turbine induces linear motion in a mechanical linkage arm connected to the turbine by pin joints where the mechanical linkage arm drives a mechanical load. The gas stream is then discharged to ambient through an exhaust port which extends from the turbine housing.

In the case where the fuel set employed undergoes a phase change, a liquid reservoir provides a continuous gaseous head of suitable pressure. If the fuel set involves a chemical reaction, the liquid reactants are transported to the reaction chamber by capillary pumping, pressure feed, or mechanical pump, whereby the reaction produces the high-flow gas. The reaction may also be spontaneous or initiated by heat or a catalyst.

The gas-driven microturbine is fully batch-fabricated and not an assembly of separately fabricated piece-components of the prior art. The inclusion of a third deposited layer of mechanical polysilicon allows for greater complexity in the micromechanical design. The first polysilicon layer is referred to as "POLY 0" and does not form mechanical structures but acts as electrical interconnect and shield polysilicon on the silicon substrate. The first, second, and third mechanical polysilicon films are referred to as "POLY 1," "POLY 2," and "POLY 3," respectively, and these films are where the mechanical structures of the gas-driven microturbine are created.

The gas-driven microturbine and its micropropulsion system components are fabricated from a series of structural layers using a number of sequentially deposited films of fine-grained polycrystalline silicon and silicon nitride, with interleaving sacrificial layers of silicon dioxide, on a single-crystal silicon substrate material. The fabrication process starts with a single crystal silicon substrate that is coated with a dielectric isolation film of Low Pressure Chemical Vapor Deposited (LPCVD) silicon-rich nitride over a thermal oxide. The structural components are realized through an intricate and delicate patterning, chemical etching, deposition, and removal process from a multilayer sandwich of polysilicon films and interleaving sacrificial films. Isolation films (the interleaving sacrificial films) ensure that proper electrical isolation is achieved between electrically active parts of the gas-driven microturbine structure. The first patterned layer serves as the electrical interconnect and shield polysilicon, POLY 0. Next, the stator-to-substrate anchor areas are created (POLY 1), followed by the deposition of a first sacrificial layer, after which stiction-reduction dimple molds are patterned into the first sacrificial layer. A subsequent polysilicon and oxide deposition fills the anchor and mold areas for attaching the mechanical structures to the substrate, after which subsequent polysilicon and oxide depositions and selective removal of sacrificial layers form the core propulsion components of the gas-driven microturbine.

Let it be understood that the foregoing description is only illustrative of the invention. To those skilled in the art to which this invention relates, many changes in the construction and widely different embodiments and applications of the invention will suggest themselves from the spirit and scope of the invention. The disclosure and the descriptions herein are purely illustrative and are not intended to be in any sense limiting. Therefore, the objects and advantages of the invention may be realized and attained by means of the instrumentalities and combinations addressed in the appended claims.

BRIEF DESCRIPTION OF THE DRAWINGS

The accompanying drawings, which are incorporated in and form part of the specification, illustrate an embodiment of the present invention and, together with the description, serve to explain the operation, features, and advantages of the invention.

DETAILED DESCRIPTION OF THE INVENTION

Figure 1:
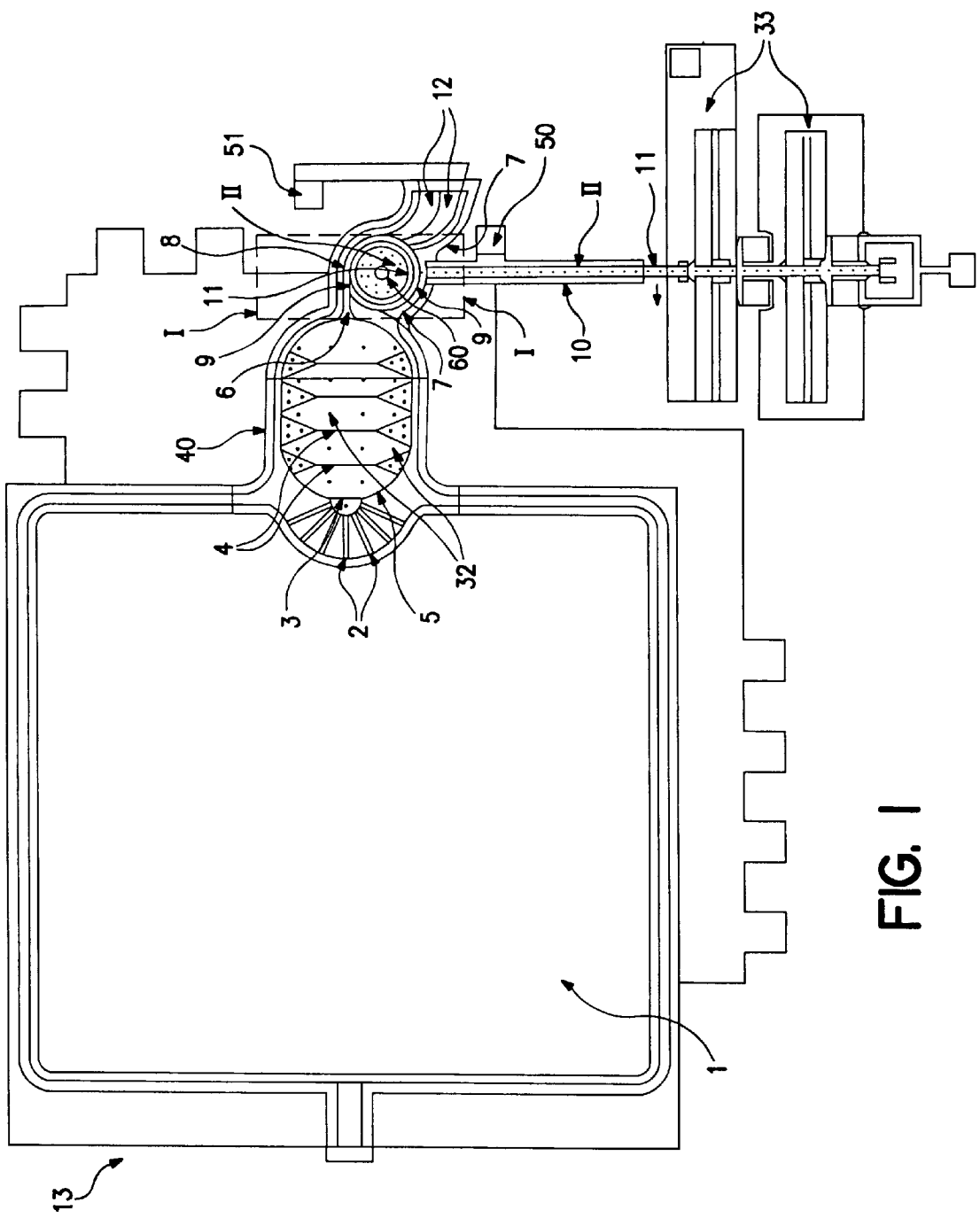
FIG. 1 is an illustration of the gas-driven microturbine showing the core propulsion elements formed on the silicon substrate and the actuated element connected to the turbine by a mechanical linkage arm.

FIG. 1 shows the gas-driven microturbine of the invention, having core propulsion elements formed on a silicon substrate base 13 through an intricate and extensive patterning and etching process involving the deposition and removal of interleaving layers of polysilicon material and silicon dioxide. The primary components of the gas-driven microturbine consist of: a holding tank 1, a fuel delivery system comprising at least one inlet tube 2, here shown as a plurality of inlet tubes 2, a pre-heater element 3, thermal assist polysilicon filaments 4, a reaction chamber 5, a flow channel 6, a turbine housing 7, a turbine shroud 8, a turbine 9, a mechanical linkage arm 10, pin joints 11 (both locations can be seen in FIG. 1), an exhaust port 12, anchor locations 50 and 51, membrane holes 32, reaction chamber cover 40 and hub 60.

Anchor locations 50 and 51 represent a cut through the nitride and oxide layers to expose the substrate at the POLY 0 level; these anchors act as an electrical ground plane to prevent electrostatic attraction between parts of the microturbine. The anchor cuts themselves are not shown, but their locations 50 and 51 can be seen representing the actual anchor cut covered with later deposited thin layers of polysilicon from POLY 1, 2, and 3. Pin joints 11 include pin joint cavities 11a and 11b, and pin joint connections 11c and 11d. Pin joints 11 allow the formation, and ultimately the rotation, of the hub for the microturbine; pin joint cavities 11a and 11b act as the spacers for fixing the mechanical structures to the substrate. In addition, FIG. 1 shows an actuated element 33 that is connected to the turbine 9 by mechanical linkage arm 10. Dashed line I defines the rectangular area for magnified views shown in FIGS. 2 and 3, and section line II—II through mechanical linkage arm 10 defines the line for the cross-sectional views shown in FIGS. 4A–4Q.

Figure 2:
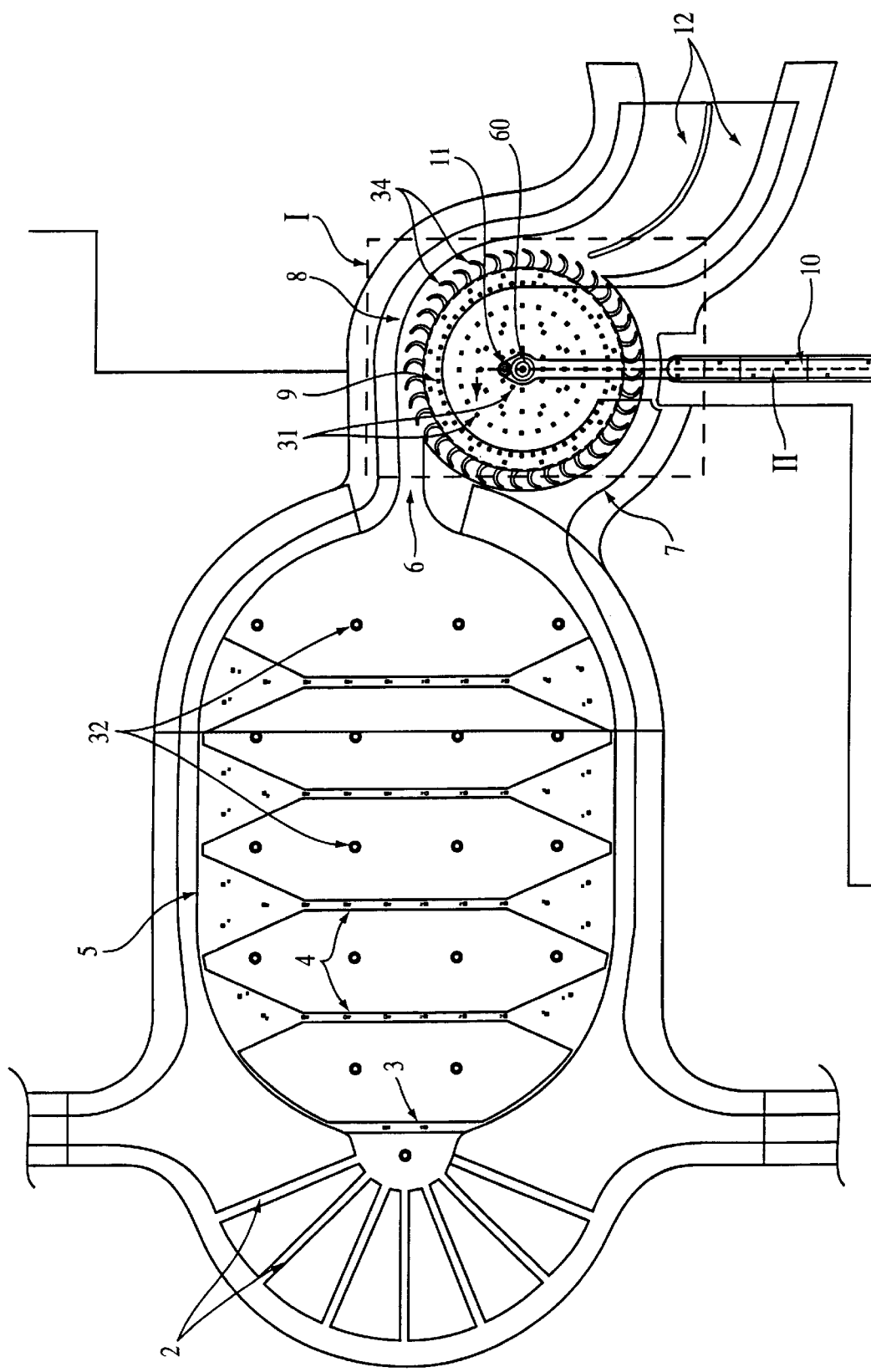
FIG. 2 is a top-view magnification of the reaction chamber with the turbine.

FIG. 2 is a close-up of the area enclosed by the dashed line I in FIG. 1, more clearly showing fuel delivery and inlet tubes 2, pre-heater element 3, thermal assist polysilicon filaments 4, reaction chamber 5, flow channel 6, turbine housing 7, turbine shroud 8, turbine 9, the top portion of mechanical linkage arm 10, the top pin joint 11, exhaust port 12, dimples 31, membrane holes 32, individual turbine blades 34, hub 60, and the top portion of section line II—II. A larger magnification of the turbine housing 7 area is provided in FIG. 3 which shows the turbine shroud 8, turbine 9, the top portion of mechanical linkage arm 10, the top pin joint 11, dimples 31, membrane holes 32, individual turbine blades 34, hub 60, and a portion of section line II—II, all being taken at the detail delineated by the dashed line I.

Figure 3:
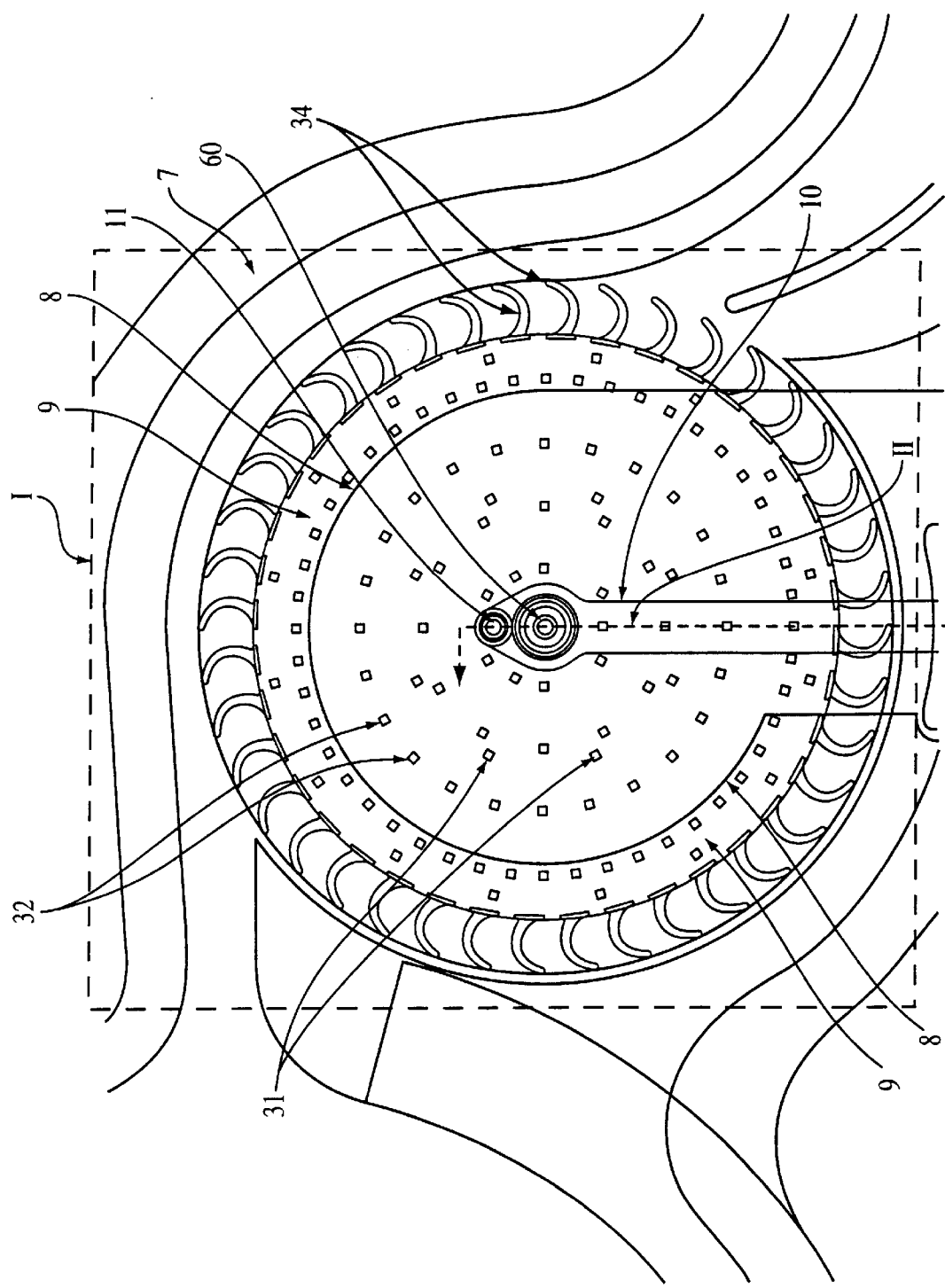
FIG. 3 is a top-view magnification of the turbine housing area, turbine, turbine blades, turbine shroud, and exhaust port of the gas-driven microturbine.

It should be noted that FIGS. 1, 2, and 3 are views seen through a cover 40 that covers reaction chamber 5 and in the operation of the gas-driven microturbine contains the hot gases (the fuel set). For purposes of the Figures and the following description, cover 40 is considered to be transparent; in actuality, cover 40 is opaque.

In operation, the energy output from the gas-driven microturbine may be harnessed to drive either a mechanical load in the form of a micromachine to perform some specific function or an electrical load through an actuated element or an electromagnetic generator. Inlet tubes 2 of the gas-driven microturbine transport a fuel set from holding tank 1 to reaction chamber 5 where the fuel set is heated by thermal assist polysilicon filaments 4 which are located internally within reaction chamber 5. As the fuel set is heated, the pressure generated within reaction chamber 5 is increased, and the resultant heated gas is directed to flow channel 6 which extends directly from reaction chamber 5 into turbine housing 7, which contains turbine 9. The high-flow gas stream and pressure drive turbine 9, and the rotary motion of turbine 9 induces linear motion in mechanical linkage arm 10. Mechanical linkage arm 10 is connected to turbine 9 and is also connected to actuated element 33 by pin joints 11. The linear motion of mechanical linkage arm 10 induces motion in actuated element 33 to generate power for specialized applications.

In alternative embodiments, flow channel 6 may be redesigned to achieve higher flow velocities, thus effectuating a mechanical load that generates more power from actuated element 33. Additionally, by redesigning turbine 9, the configuration of turbine blades 34, and/or flow channel 6, or by employing a fuel set with higher reaction chemistries, the gas-driven microturbine can be reconfigured to yield higher force, torque, or output power.

The present invention is also directed to a unique method for forming microstructures by surface-micromachining utilizing polysilicon as the structural material and silicon oxide for interleaving sacrificial layers. Although other suitable materials for the structural material and sacrificial layers may be utilized where appropriate, the high surface mobility of silicon atoms during chemical vapor deposition growth of layers is significant in facilitating the backfilling of undercut regions where necessitated.

The fabrication of micromechanical structures is known, as described in U.S. Pat. No. 5,252,881 (Muller et al.), entitled "Micro Motors and Method for Their Fabrication," the disclosure of which is incorporated herein by reference. However, unlike previously known fabrication techniques, the present invention comprises a three-level, batch-fabrication, polysilicon surface-micromachining process using polysilicon for the structural material and silicon oxide for the sacrificial layers, all formed on a silicon substrate base with multiple photoresist layers, patterning/etching steps, and removal of photoresist layers accompanying each polysilicon deposition. Also, after each successive deposition of oxide and polysilicon and removal by patterning and etching (this includes the substrate base 13, with its attached layers (POLY 0), and each of the layers for forming structural components (POLY 3, POLY 2, POLY 1)), the respective layers are subjected to an acid bath for cleaning, and the process of adding intervening layers of oxide and polysilicon and patterning and etching is repeated. The final step involves releasing the etch to remove the remaining oxides to produce the free-standing gas-driven microturbine components.

It should be noted that the fabrication of the core propulsion system of the gas-driven microturbine requires four depositions of poly silicon, in which the first layer of polysilicon serves as the voltage reference plane and the electrical interconnect while the three remaining polysilicon layers serve to form the mechanical and structural elements of the propulsion system. Also, although four layers of polysilicon are deposited, since the second, third and fourth layers (POLY 1, POLY 2, and POLY 3, respectively) are the layers where the working components of the gas-driven microturbine are formed, the process is generally termed a three-level fabrication process, and the first polysilicon level is termed POLY 0.

The general fabrication process for the gas-driven microturbine, according to the present invention, may be described by reference to FIGS. 4A–4Q, which show the steps of the polysilicon surface-micromachining batch-fabrication process for the working components of the gas-driven microturbine in a series of cross-sectional views taken at dashed line II—II shown on FIGS. 1, 2, and 3. Line II—II extends through mechanical linkage arm 10, which is defined in the same plane as turbine housing 7, and effectively shows the elements of turbine 9 as it is fabricated.

The process begins with choosing a substrate base 13 comprising suitably doped single crystal silicon wafer of conventional quality. While other semiconductor materials may be utilized in the formation of the microstructures, single crystal silicon provides excellent material properties and such a wafer type is preferable since it is readily available, is relatively inexpensive, and is commonly used in integrated circuit (IC) processes. Whatever materials are chosen, the substrate must be planar.

Figure 4A:
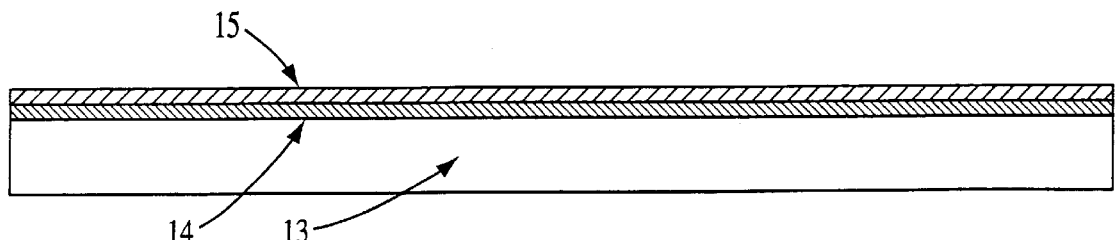
FIGS. 4A–4Q are cross-sectional illustrations of the steps of the batch-fabrication sequence for the present invention.

Beginning at FIG. 4A, the substrate base 13 of silicon crystal is first cleaned and then provided with an insulating layer of oxide and silicon nitride. The silicon substrate base 13 is immersed in a commercially available buffered hydrofluoric acid and then cleaned by rinsing in a deionized water. Any standard cleaning cycle associated with (IC) processing may be used. For the present invention, a modified standard cleaning process is used to prepare the substrate base 13 for fabrication. Buffered hydrofluoric acid is used because it is effective for removing the silicon oxide without substantially affecting the underlying single crystal silicon material when it is exposed as a result of the patterning of the photoresist layer. The oxide and nitride layer combine to create an insulation (electrical isolation) layer between the substrate base 13 and propulsion components of the gas-driven microturbine to be formed from the POLY 1, POLY 2, and POLY 3 depositions, respectively. Throughout this description, the terms "insulate" and "electrically isolate" are used interchangeably with reference to the oxide and nitride layers applied in the fabrication process of the present invention, both terms being applicable in the sense of electronics.

Substrate base 13 of (100) crystallographic orientation (this is a commonly known wafer crystallographic orientation here applied to the substrate base) is subjected to a silicon-oxidizing ambient for a period of time sufficient to grow a 6300 Å-thick thermal silicon dioxide layer 14 over substrate base 13. This is followed by the deposition of an 8000 Å-thick low-stress silicon nitride layer 15 applied by Low Pressure Chemical Vapor Deposition (LPCVD) at 850° C.

The next step is to pattern and etch the silicon nitride 15 followed by an etch of the oxide 14. The patterned nitride and oxide on substrate base 13 are RIE-etched to remove the oxide which was exposed as a result of the patterning of the photoresist. In this step, full-depth cuts are formed through the nitride 15 and oxide 14 to expose substrate base 13; these cuts are made in areas where it is desired to make electrical contact with the silicon substrate base 13. These anchor cuts are not specifically shown but their location, under the layer that becomes POLY 0, is designated by areas labeled 50 and 51 in FIGS. 1, 5, 7, and 8. Anchor locations 50 and 51 act to establish a contact to the substrate 13, and the microturbine layers are fabricated.

Figure 5:
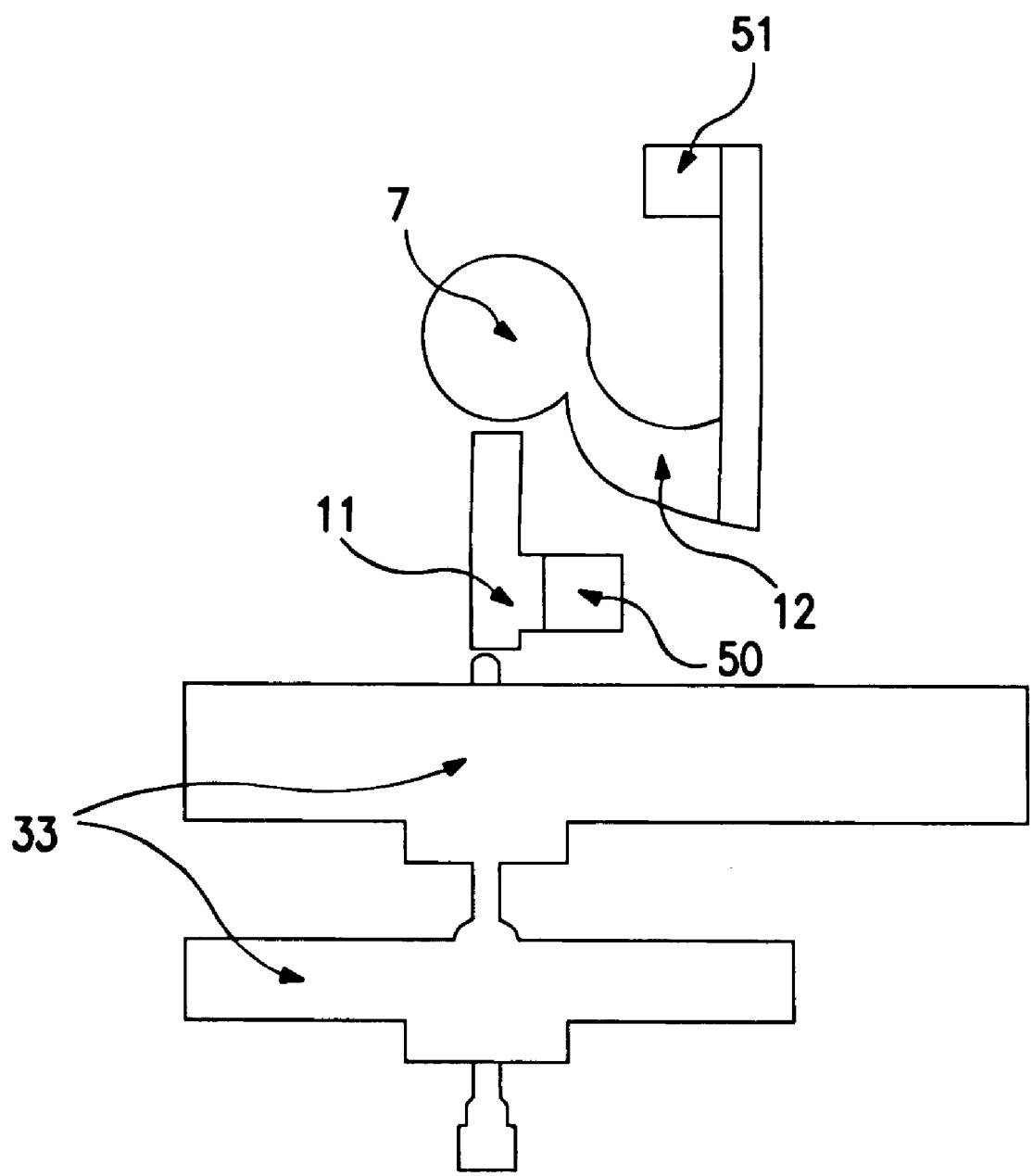
FIG. 5 is a top view of the POLY 0 voltage reference plane.

A 3000 Å-thick layer of phosphorus-doped and highly conductive LPCVD polysilicon 16 (POLY 0) is then deposited at 575° C. to form the voltage reference plane and electrical interconnect. A top view of the voltage reference plane formed at the POLY 0 level is shown in FIG. 5. A photoresist material (mask or reticle) is applied to POLY 0 layer 16; layer 16 is then patterned by exposure to ultraviolet light through the mask. POLY 0 layer 16 is subsequently etched to give the cut for the initial layout of turbine housing 7, mechanical linkage arm 10, exhaust port 12, and actuated element 33. FIG. 5 shows the cut for this initial layout, as well as anchor locations 50 and 51.

This photoresist layer/patterning process for this and other layers (POLY 1, POLY 2, POLY 3) involves spinning a light-sensitive photoresist material onto the polysilicon and then exposing it through a photoresist mask to ultraviolet light which affects the susceptibility of the exposed photoresist material to a conventional developer. When the phororesist material in predetermined areas is exposed to ultraviolet light, the exposed areas experience chain scission of the high molecular weight material and thus the exposed photoresist areas become susceptible to a developer. Using POLY 0 layer 16 as the example for this process, exposed photoresist material is removed by applying ultraviolet light and by. subjecting the substrate base 13, including its attached layers, to a developer bath. Then, where the-photoresist material is not covering the POLY 0 layer 16, the layer is etched by reactive ion etching (RIE), a dry etch process that is common in the IC industry.

Figure 4B:
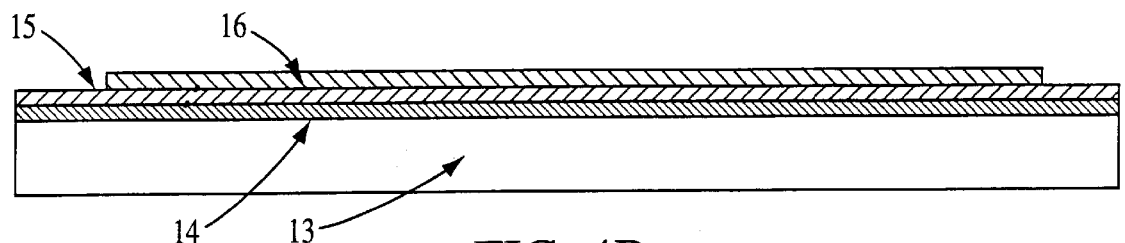

The substrate base 13, including all layers deposited up to this point, or POLY 0, is then cleaned to make it ready for the deposition of a second layer of oxide, the first sacrificial layer. The substrate base 13 and its attached layers, including the POLY 0 layer, at this stage of the fabrication process, are shown in FIG. 4B.

Figure 4C:
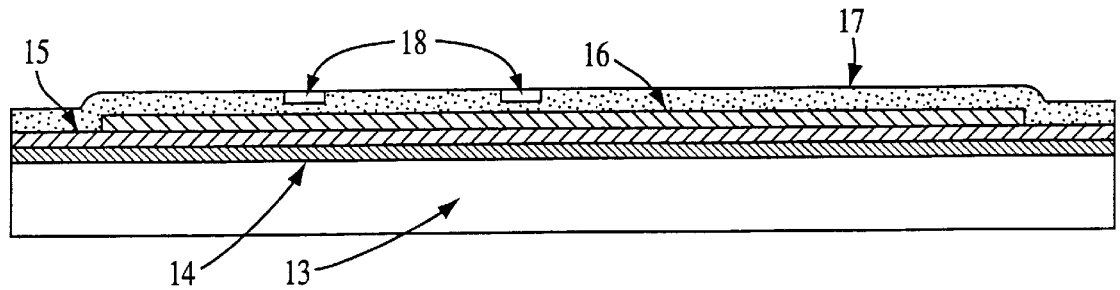
Figure 6:
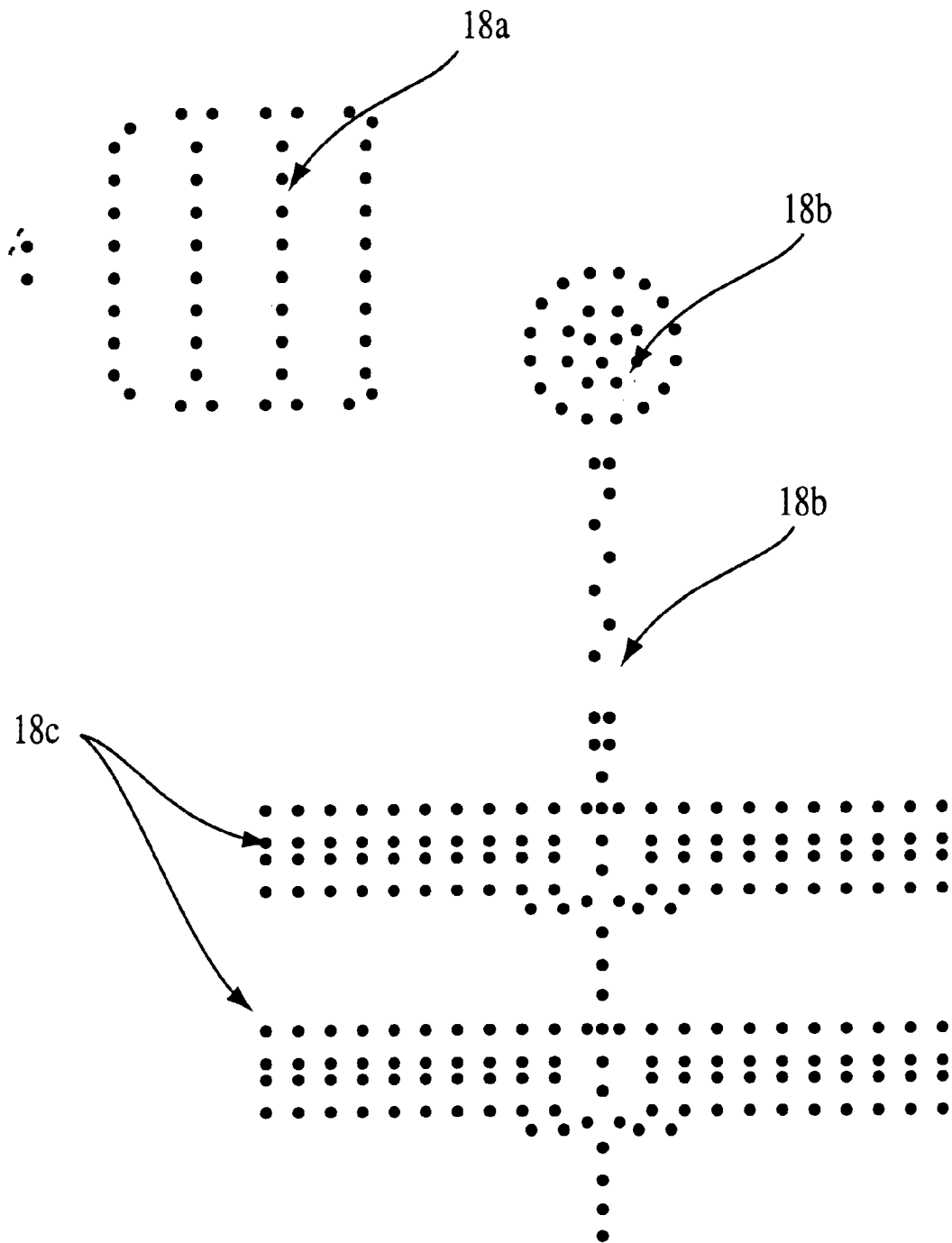
FIG. 6 is a top view of the stiction-reduction dimple molds for the reaction chamber, turbine housing, turbine, mechanical linkage arm, and actuated element.

A 2 μm thick oxide 17 or other material such as phosphorus-doped low-temperature-oxide or phosphosilicate glass is next deposited to form the first sacrificial layer 17. Photoresist material is then spun onto oxide 17 where it is patterned by exposure to ultraviolet light through a photoresist mask to define areas in the first sacrificial layer to be partially etched out. Partial-depth cuts 18, also called stiction-reduction dimples, of approximately 1.5 μm are etched into the oxide layer 17 in a specific pattern by means of a time-controlled etch process. This is called a dimple etch and the resultant pattern of dimples 18 is seen in FIG. 6 (discussed below). FIG. 4C shows the deposited sacrificial oxide layer 17 and the etched dimples 18. FIG. 6 is a top view of the very specifically patterned dimples 18 in layout. The purpose of dimples 18 is to minimize the area of the later-deposited films that can come in contact with the POLY 0 layer. Dimples 18a are the separation for the later-formed reaction chamber 5; dimples 18b are the separation covering the POLY 0 layout for the base of the turbine housing 7, pin joints 11, and hub 60; and dimples 18c are the separation covering the POLY 0 layout for the actuated element 33.

Figure 4D:
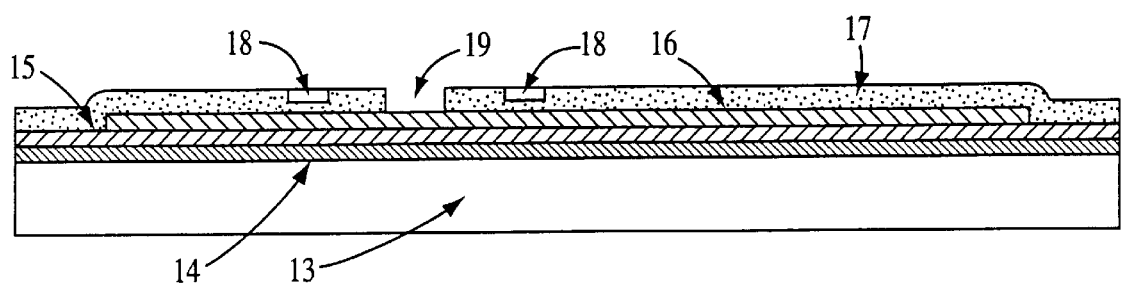

With the partial-depth cuts 18 into the oxide layer completed, a low-stress nitride layer is deposited followed by the deposition of photoresist material which is then patterned by exposure to ultraviolet light through a photoresist mask, as previously described. This photoresist coat and the patterning/etching steps are used to etch all the way though the nitride and oxide layers to expose POLY 0. The chemical etch removes portions of the nitride and oxide layers 17 where they are not protected by the photoresist mask in order to provide the anchor areas 19 for the subsequent deposition of polysilicon (POLY 1) and to anchor the first structural layer (POLY 1) components to the substrate base 13. It should be noted that in alternative embodiments the anchor areas 19 may be provided either on the nitride coating or on the substrate base. FIG. 4D is a cross-sectional view showing where the first sacrificial layer or oxide 17 has been removed, specifically dimples 18 and anchor cut 19 in the sacrificial layer or oxide layer 17.

Figure 7:
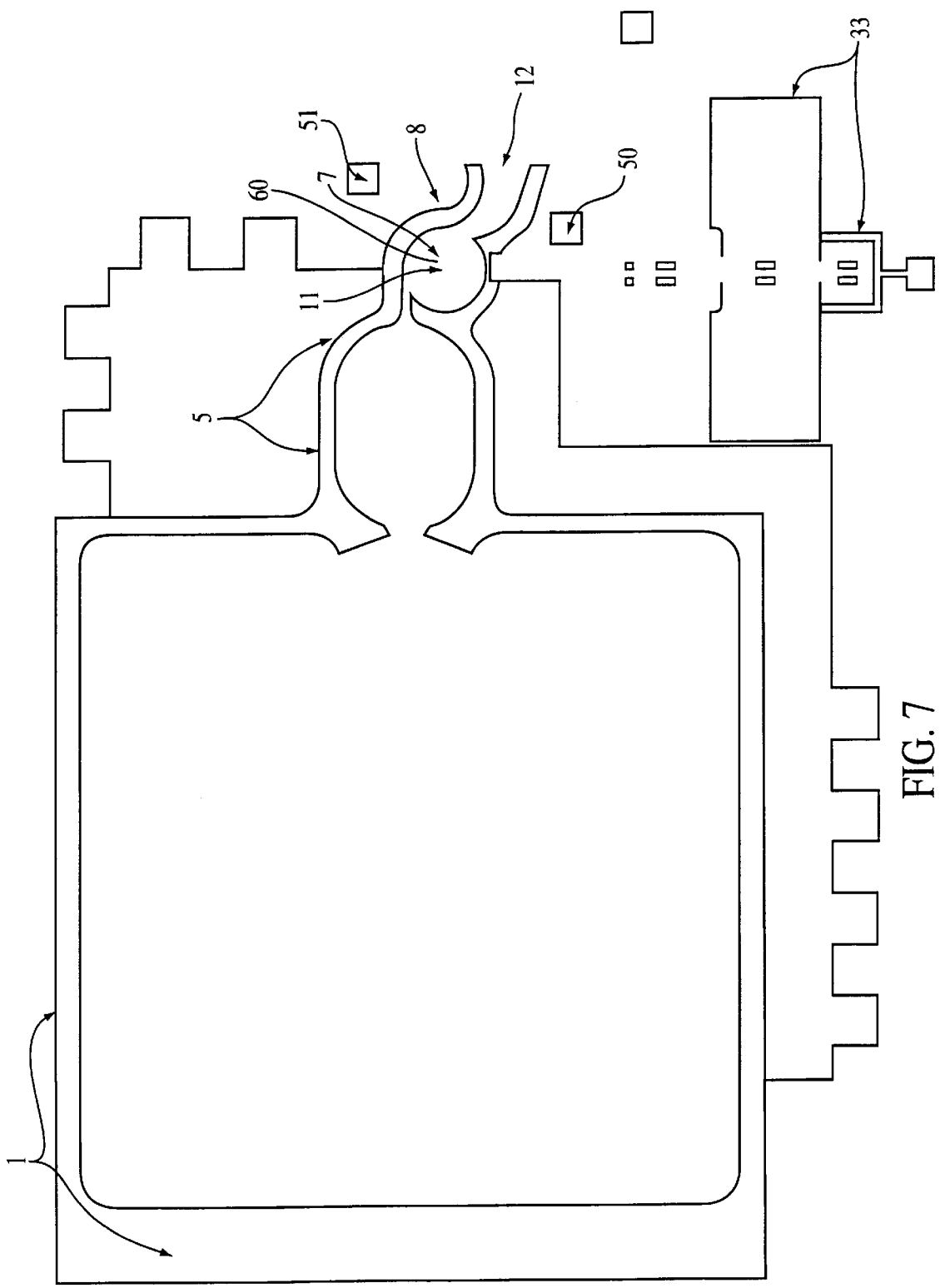
FIG. 7 is a top view of the anchor cut for fixing the POLY 1 structural components to the substrate base.

FIG. 7 is a top view of the anchor area cut (also called the stator-to-substrate cut) for the POLY 1 structural components to be developed by the end of the POLY 1 deposition, and shows the outer periphery of the holding tank 1, reaction chamber 5, turbine housing 7, turbine shroud 8, exhaust port 12, further refinements of pin joints 11, mechanical linkage arm 10, and actuated element 33. The anchor area shown in FIG. 7 is where the refinements of the POLY 1 structural components that form the stator, or the portion of the gas-driven microturbine that remains fixed with respect to the moving or rotating parts, are fixed to the substrate 13. The components comprising the POLY 1 layer include the initial layout of mechanical linkage arm 10, turbine housing 7, turbine shroud 8, hub 60, and exhaust port 12.

Stiction-reduction dimple molds 18 having been patterned, and stator-to-substrate anchor areas 19 having been cut, into the first sacrificial layer 17, the layered structure at the stage shown in FIG. 4D is ready for the subsequent polysilicon deposition (POLY 1).

Figure 4E:
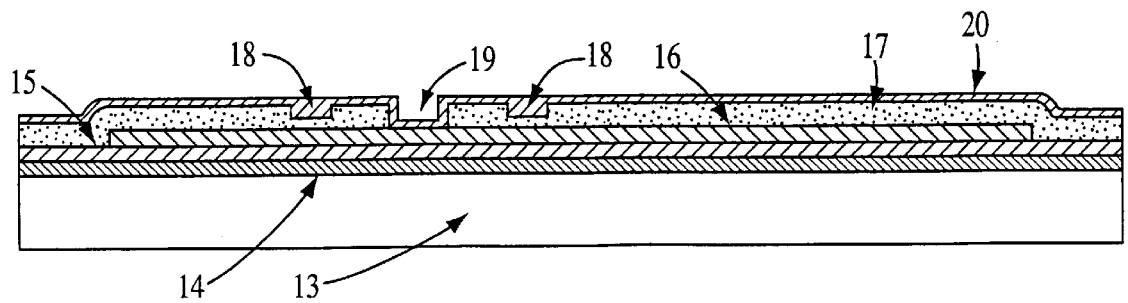

A 1 μm layer of polysilicon 20 (POLY 1) is next deposited consisting of a 1000 Å-thick in-situ doped-polysilicon at 570° C., a 500 Å-thick undoped polysilicon capping layer at 570° C., and an 8500 Å-thick undoped polysilicon at 580° C. The POLY 1 deposition fills the dimples 18 and the anchor areas 19 left in the first sacrificial layer 17 in order to fix the mechanical structures to substrate 13. The layered structure at this step is illustrated in FIG. 4E showing polysilicon 20 (POLY 1) deposited on sacrificial layer 17 with dimples 18 and anchor area 19 still showing, although filled with polysilicon 20 (POLY 1). It is at the polysilicon 20 (POLY 1) level that the first level structural components of the gas-driven microturbine are fabricated.

Figure 4F:
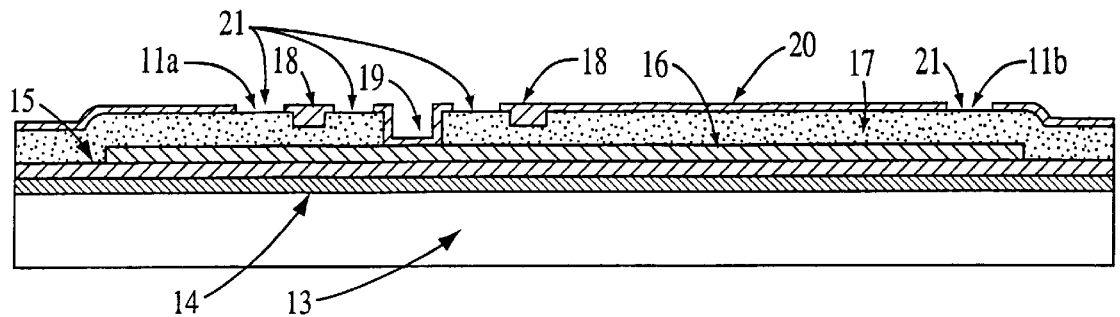

Subsequently, photoresist material is spun onto the polysilicon 20 where it is patterned by exposure to ultraviolet light through a photoresist mask in the manner previously described. A developer is applied to open only those areas where the polysilicon is to be undercut to form upper and lower flange areas 21 and the cuts for pin joints 11 (which comprise pin joint cavities 11a and 11b and pin joint connections 11c and 11d, the latter having not yet been fabricated) for turbine 9 and hub 60. Upper and lower flange areas 21 and the pin joint cavities 11a and 11b are illustrated in FIG. 4F. Pin joints 11 and hub 60 are also shown in top view in FIGS. 1, 2, and 3. Upper and lower flange areas 21 are cut into POLY 1 to open areas for the pin joint connections 11c and 11d (not yet formed) and pin joint cavities 11a and 11b and to allow turbine 9 ultimately to spin on hub 60.

Figure 4G:
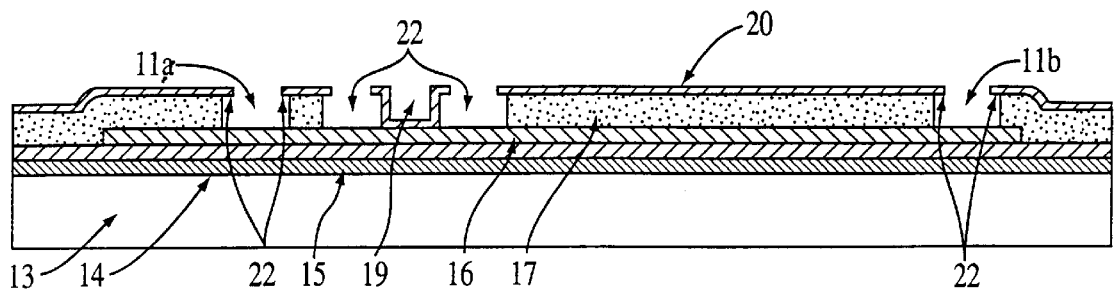

The open areas in the photoresist allow transfer of the pattern to the POLY 1 by RIE etching of polysilicon layer 20. Continuing with the fabrication steps, the oxide under POLY 1 is laterally etched to a depth of 2.5 μm illustrated as cuts 22 in FIG. 4G. This step completes the POLY 1 layer.

Figure 4H:
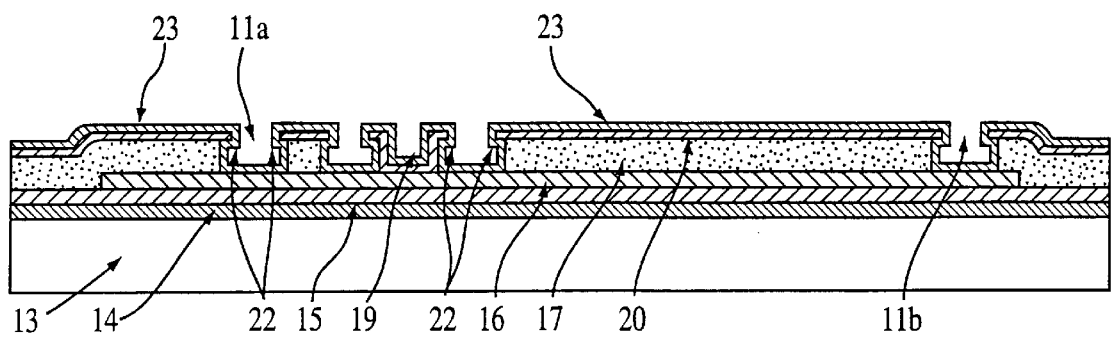
Figure 4I:
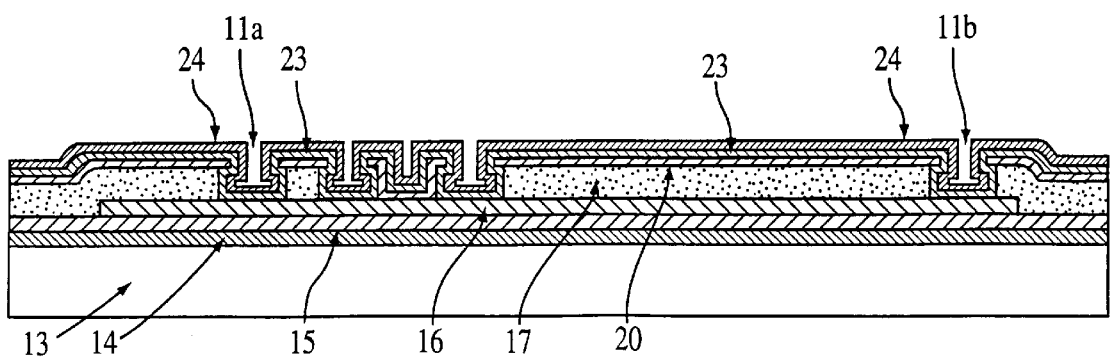
Figure 4J:
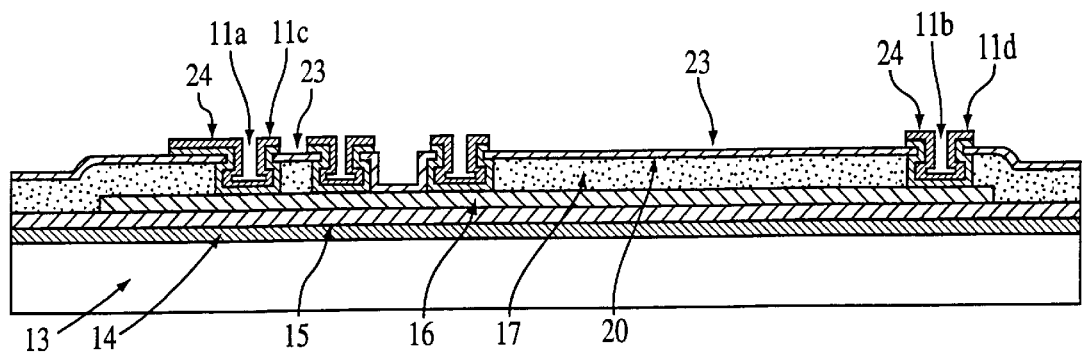

The second sacrificial layer begins with backfilling the undercut areas created in POLY 1 with a 0.5 μm layer of oxide material 23 and annealing the stack at 1100° C. for three hours in nitrogen. See FIG. 4H. Next, a 1500 Å-thick low-stress silicon nitride layer is deposited to form a friction reduction layer 24, which is shown in FIG. 4I. Photoresist material is once again spun onto the silicon nitride 24 where it is patterned by exposure to ultraviolet light through a mask, as has been previously described, and chemically etched to create the structure shown in FIG. 4J. FIG. 4J is a cross-sectional view showing where the second sacrificial layer or oxide 23, with its nitride layer 24, has been retained. In the completion of the second sacrificial layer, the POLY 1 layer is undercut to complete the formation of the pin joint cavities 11a and 11b. Areas of exposed photoresist material have been removed, and etching has removed backfill sacrificial oxide from around the pin joints 11 area and the hub 60 area to allow the upcoming POLY 2 layer to anchor to the POLY 1 layer outside the pin joint 11 and hub 60 region. Once the photoresist material is removed, substrate 13, and its attached layers, are cleaned before the next deposition.

As seen in FIGS. 4F through 4J, pin joints 11 have been developed from openings in the polysilicon layer 20 to structural features during the POLY 1 stage in the fabrication of the gas-driven microturbine. Pin joint cavities 11a and 11b are completed at the end of the POLY 1 level, and pin joint connections 11c and 11d are completed at the end of the second sacrificial layer. Pin joints 11 serve to fix turbine 9 in its proper location about hub 60 and to connect mechanical linkage arm 10 to turbine 9 so that turbine 9 can power actuated element 33.

Figure 4K:
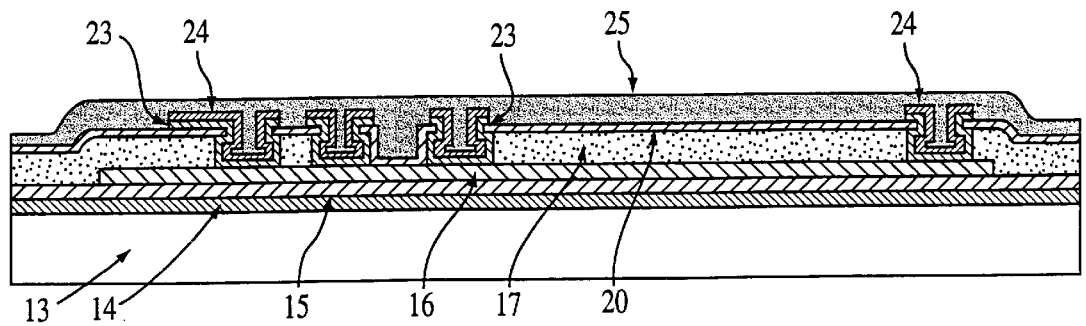
Figure 4L:
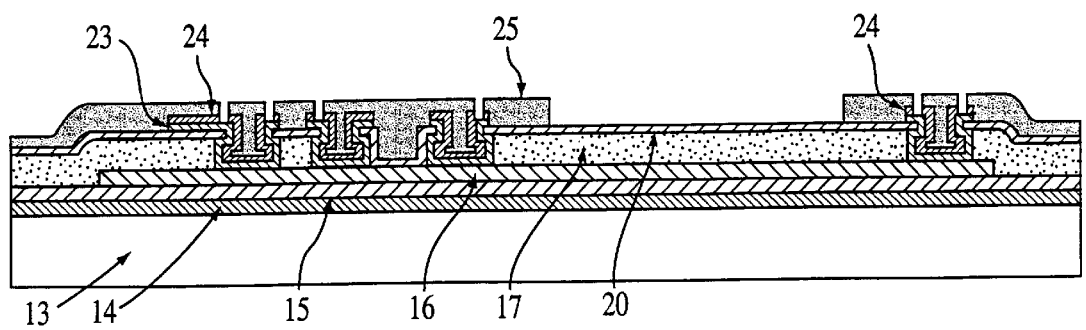
Figure 8:
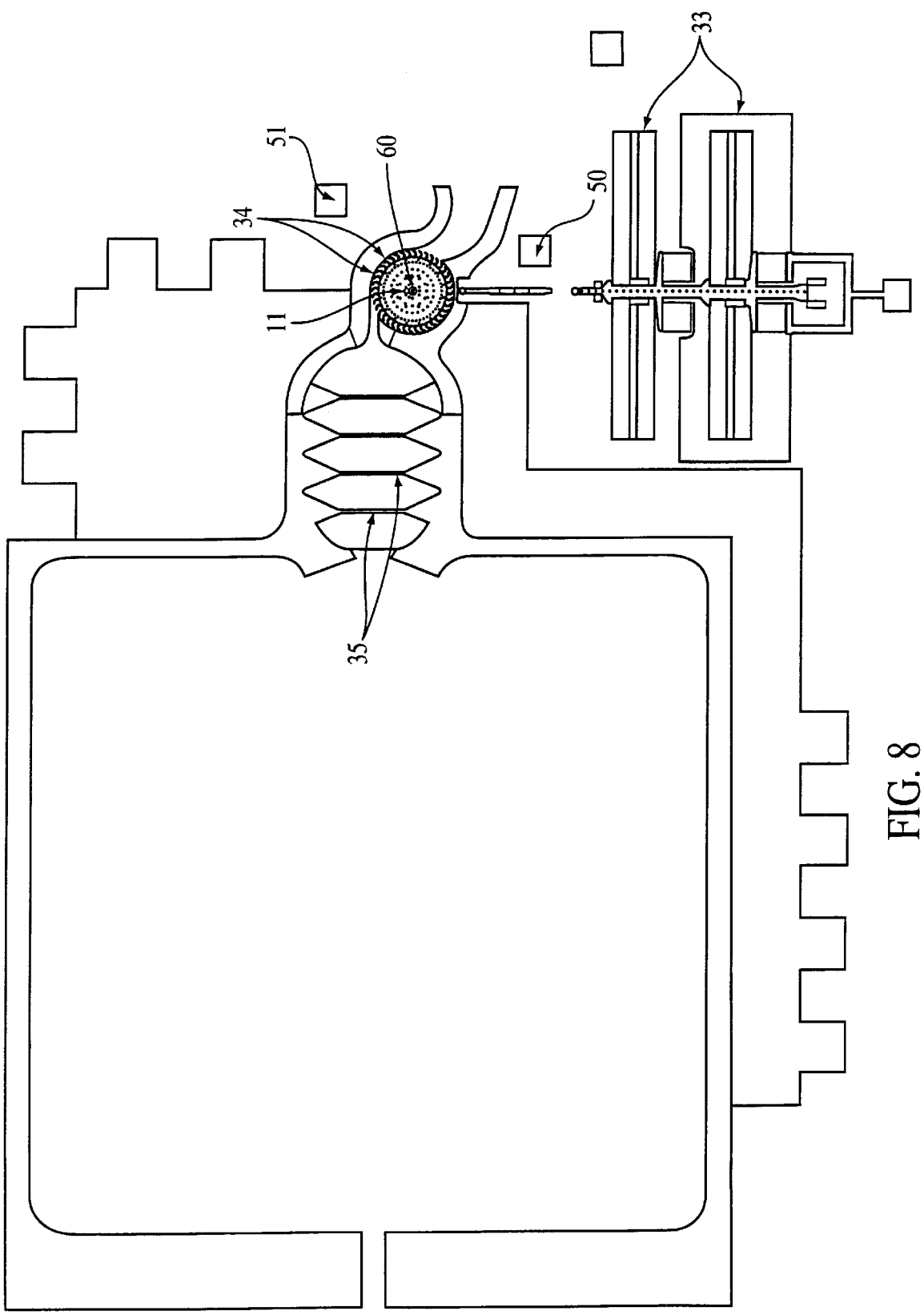
FIG. 8 is a top view of the POLY 2 level showing further refinements of the core propulsion components formed from the POLY 1 level.

After completion of the second sacrificial oxide layer, a 1.4 cm layer of undoped polysilicon 25 (POLY 2) is deposited, followed by deposition of a 1000 Å-thick layer of in-situ doped polysilicon and a 5000 Å-thick oxide layer which is annealed in nitrogen for three hours at 1100° C. The layered film structure at this stage of the process is shown in FIG. 4K. The polysilicon 25 photoresist is then patterned by exposure to ultraviolet light through a photoresist mask. The mask provides the layout for turbine 9 and individual turbine blades 34. Turbine 9 and individual turbine blades 34 are ready to be formed from an RIE dry etch to remove the exposed areas of POLY 2 which completes the POLY 2 layer. The compilation of POLY 1 and POLY 2 and their layering, i.e., the structure after POLY 1 and POLY 2 are complete, is illustrated in cross-section in FIG. 4L and in top view in FIG. 8. In particular, FIG. 8 shows the "Y-shaped" polysilicon channels 35 for housing the thermal assist polysilicon filaments 4.

Figure 4M:
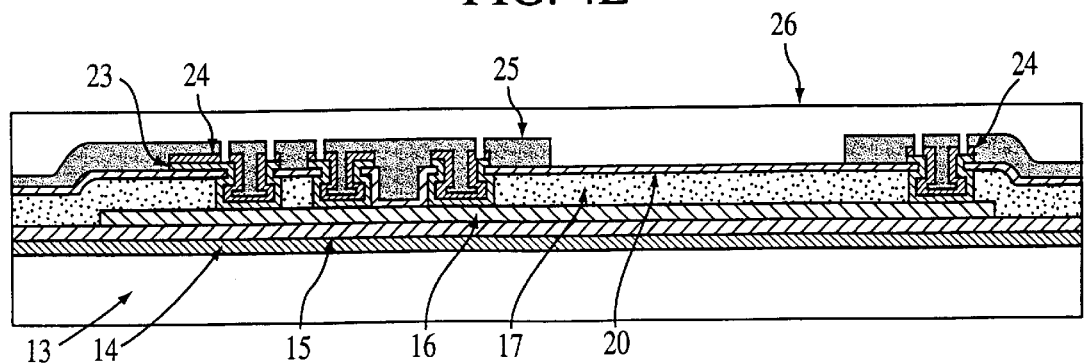
Figure 9:
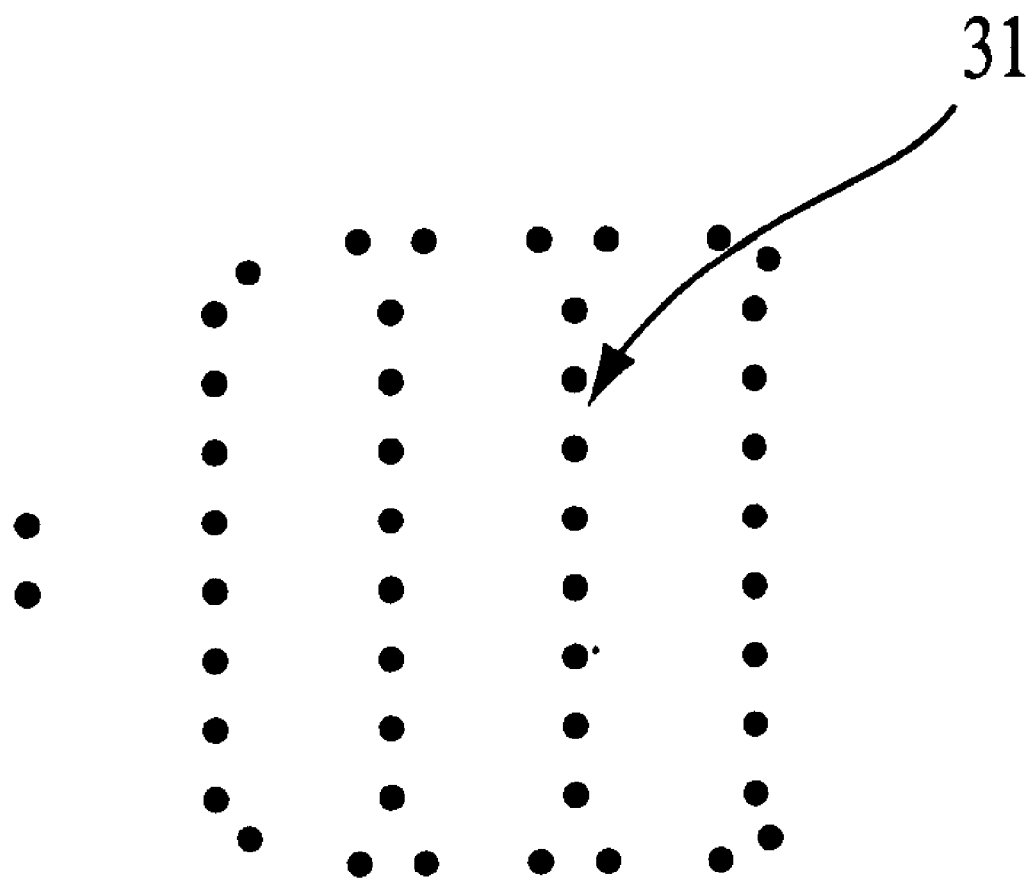
FIG. 9 is a top view showing the stiction-reduction dimple molds for the reaction chamber patterned into the POLY 2 level.

Immediately following the RIE etch of polysilicon layer 25 or POLY 2, another (the third) sacrificial oxide layer is deposited. Substrate base 13, including the propulsion components fabricated from the POLY 1 and POLY 2 depositions, is cleaned in a hydrofluoric acid bath to remove RIE polymer residues. A chemical vapor deposition of a 5.5 $\mu$m thick layer of oxide 26 is laid over the POLY 2 layer to form the third sacrificial layer. Subsequently, planarization of the third sacrificial layer is done to make the surface uniformly flat, in an effort to minimize mechanical interference between the moving parts during operation of the microturbine. See FIG. 4M. It should be noted that the planarization step is not separately represented by any one Figure. Next, photoresist material is spun onto the oxide 26 and exposed to ultraviolet light through a mask, to make it susceptible to a developer where 0.5 $\mu$m etch pits or dimples 31, as shown in FIG. 9, are made into the oxide 26. FIG. 9 provides a top view of the patterning of dimples 31.

Figure 4N:
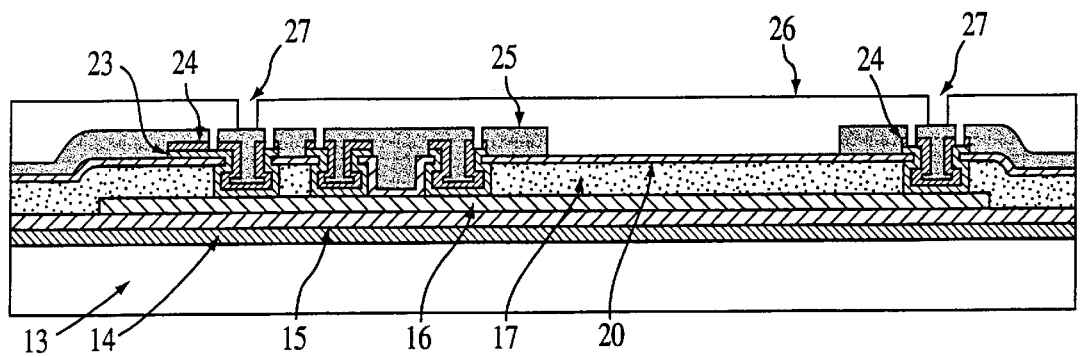
Figure 4O:
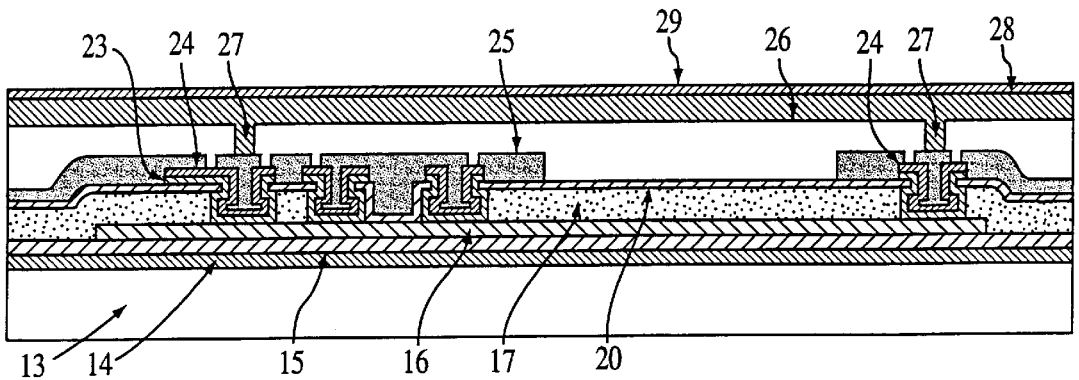
Figure 10:
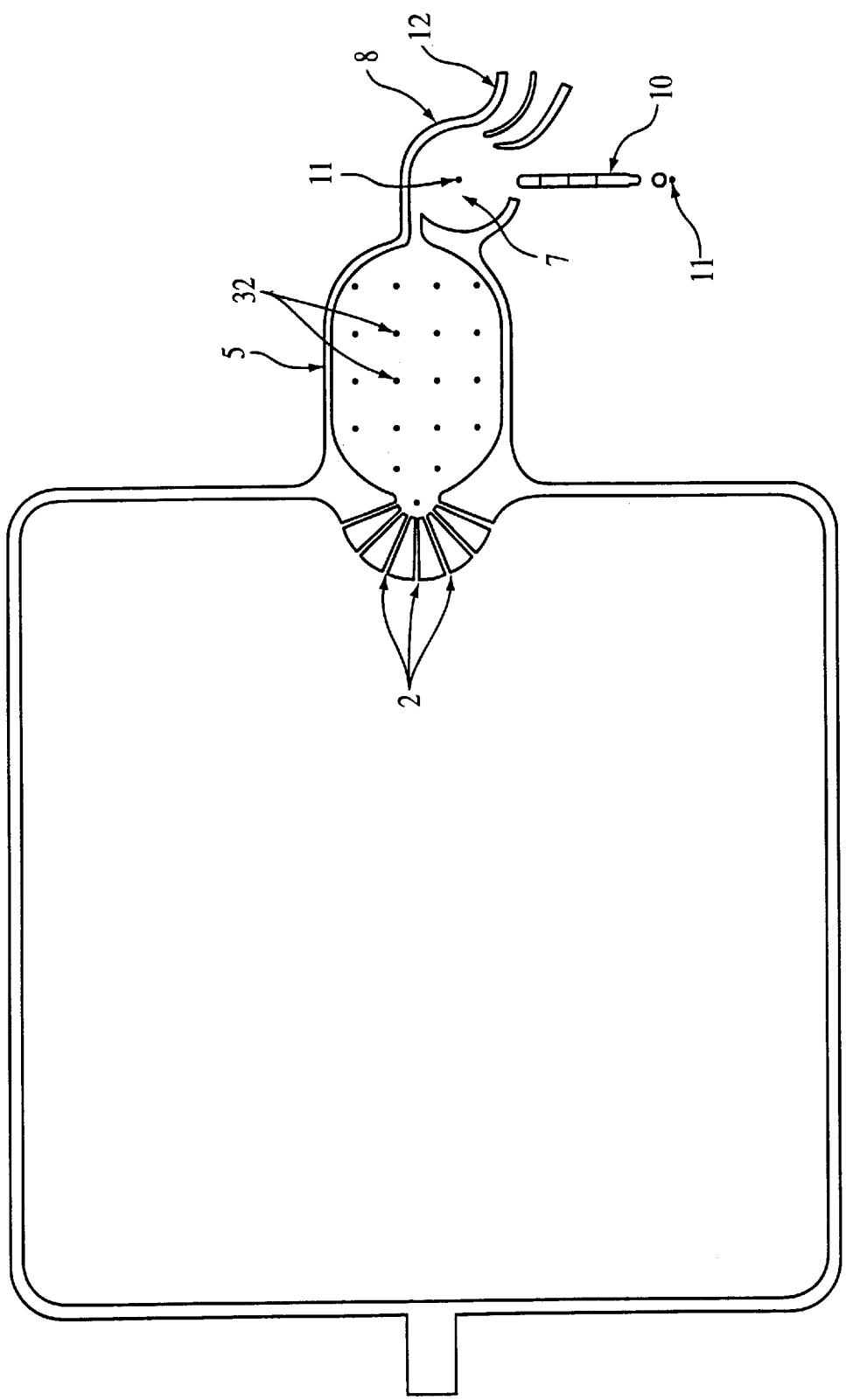
FIG. 10 is a top view of the anchor area fixing the core mechanical structures to be formed on the POLY 3 level to the POLY 2 level.
Figure 11:
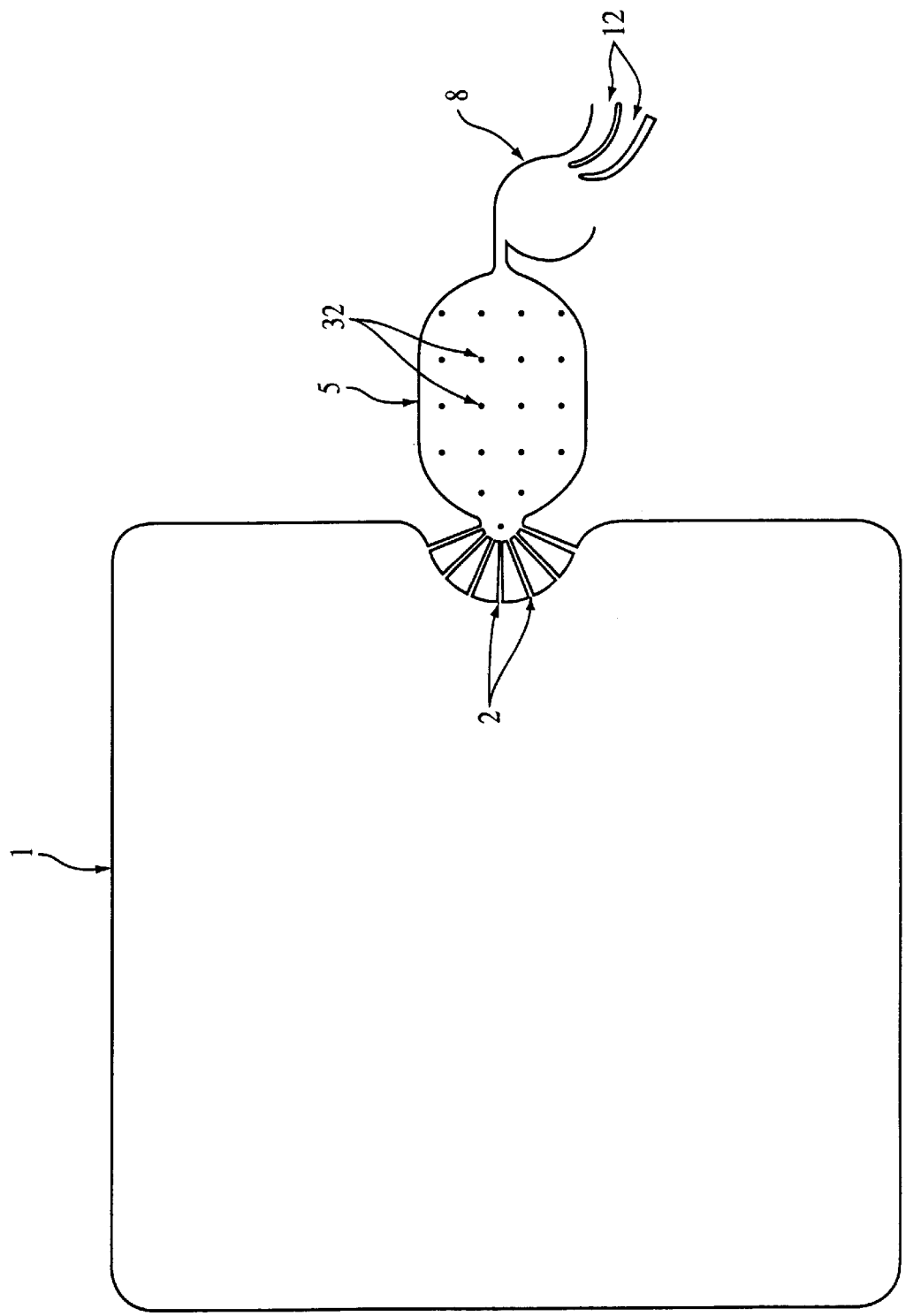
FIG. 11 is a top view of the etch release holes patterned into the POLY 3 membrane.

Following the formation of dimples 31, photoresist material is spun onto the oxide 26, where it is patterned through a mask to ultraviolet light; subsequently, oxide 26 is etched down approximately 4 $\mu$m through oxide 26 to form anchor cut 27, which is shown in FIG. 4N in cross-section. A top view of the results of the fabrication process invention up to this stage is given in FIG. 10, which shows the layout for the turbine anchor, and, more specifically, for housing 7 and turbine 9. Fuel delivery and inlet tubes 2 have been formed at this stage, including further refinements showing the mechanical construction of mechanical linkage arm 10, turbine housing 7, turbine shroud 8, pin joints 11, reaction chamber 5, and exhaust port 12. In this step, the anchor area is created where the mechanical structures to be formed from the upcoming POLY 3 deposition and fabrication process will be anchored to substrate base 13. Substrate base 13 and the mechanical structures formed to this point are then cleaned in a hydrofluoric acid dip. With that, the process of creating the third sacrificial layer is complete.

Figure 4P:
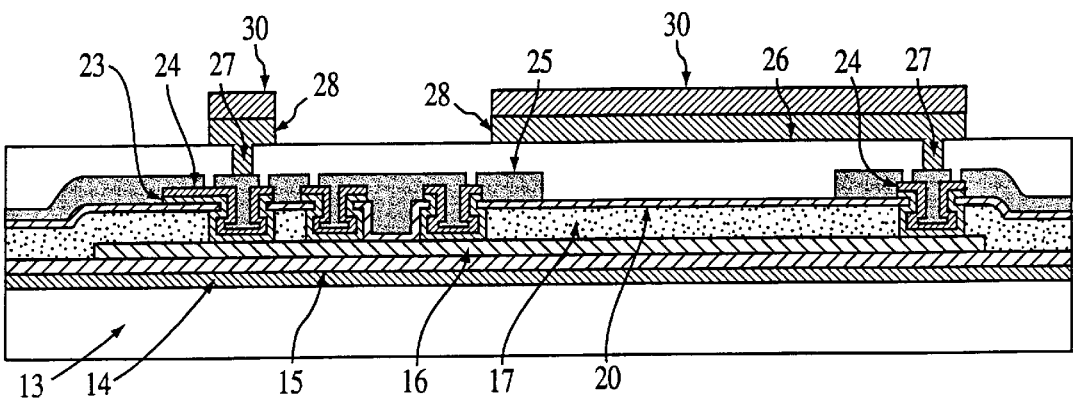
Figure 4Q:
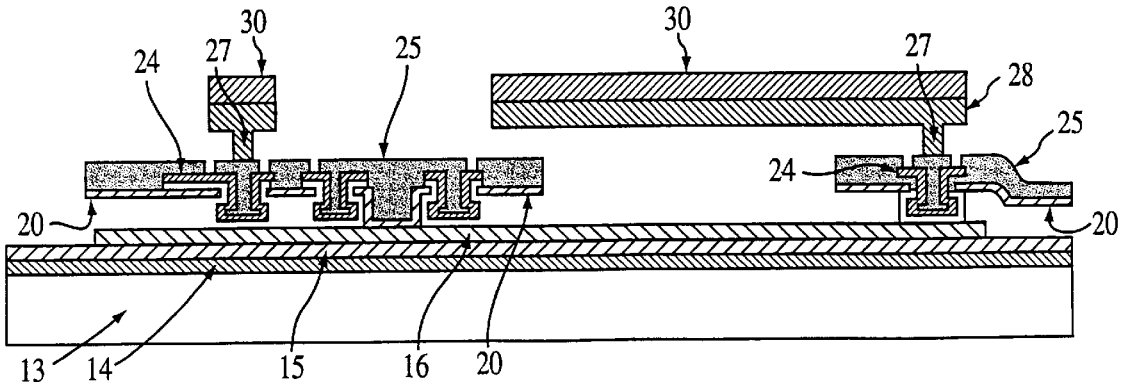

Next, to provide an electrical isolation barrier for cover 40 of reaction chamber 5 so that it does not shunt the thermal assist polysilicon filaments 4, a 1500 Å-thick low-stress nitride layer is deposited followed by a 1 $\mu$m layer of undoped polysilicon 28 (POLY 3) together with a 5000 Å-thick oxide layer 29 annealed at 1100° C. for three hours in nitrogen. Polysilicon layer 28 (POLY 3) and oxide layer 29 are shown in FIG. 40. Photoresist material is thee spun onto the oxide 29. The photoresist material is patterned by exposure to ultraviolet light and subjected to a RIE etch 1 $\mu$m deep in order to form the POLY 3 membrane holes 32 for holding tank 1, fuel delivery and inlet tubes 2, reaction chamber 5, turbine shroud 8, and exhaust port 12. Membrane holes 32 are etch release holes through the layer that release the etch material from under that layer; holes 32 act as support pillars holding cover 40 to substrate 13 and its film stack and are shown in FIGS. 1, 2, 10 and 11. The substrate base 13, and its attached layers (including formed mechanical structures), are then subjected to a hydrofluoric acid dip to remove the RIE polymers and photoresist material. A 1000 Å-thick layer of doped polysilicon 30 (the first stage of POLY 3) is then deposited after the cleaning process for the purpose of performing a wet etch of oxide 29 through the thin polysilicon film in the membrane holes. Next, a 1 $\mu$m layer of undoped polysilicon is deposited followed by a 5000 Å-thick oxide layer that is annealed at 1100° C. for three hours. The total polysilicon 30 deposition is 2 $\mu$m in depth and is illustrated in FIG. 4P.

Figure 12:
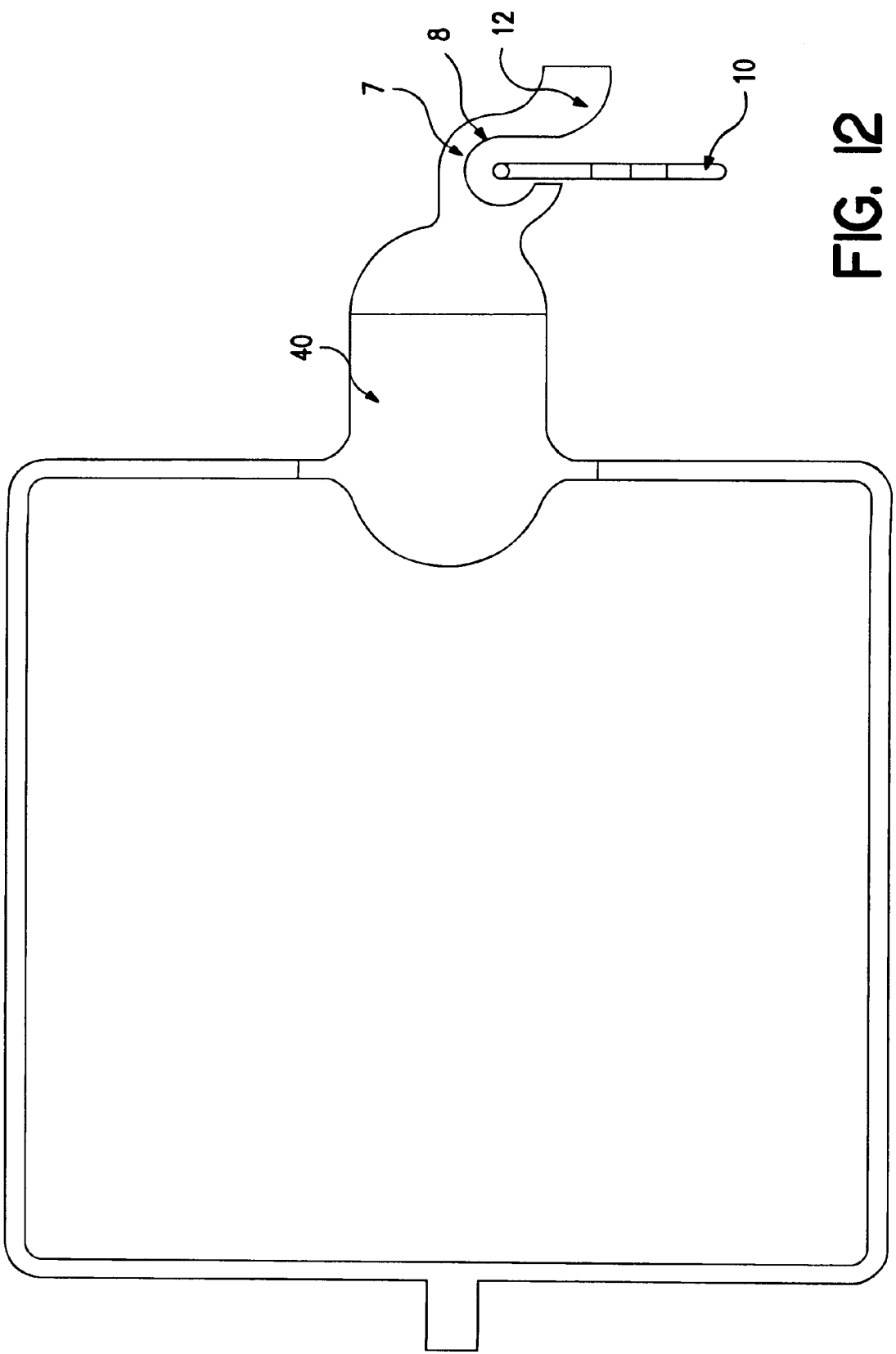
FIG. 12 is a top view of the final POLY 3 level.

The final patterning and RIE etch of the POLY 3 layer yields the final structural components as illustrated in FIG. 12, which is a top view showing the actual final pattern of the POLY 3 layer. Mechanical linkage arm 10, turbine 9, and actuated element 33, which are connected for generating power, have now been created. At this stage, turbine 9 is not yet free to rotate because it is still fixed in the oxide. Final patterning is performed into the photoresist, in the manner previously described in connection with the creation of the other layers, but this patterning allows the etch of parts into the layer of polysilicon 30 underneath, to produce the free-standing gas-driven microturbine core propulsion components.

Substrate base 13, with its attached layers, is cleaned in a final hydrofluoric acid dip where a final patterning etch is conducted to remove all remaining oxides. The final etch is a release etch, and it is this step that allows turbine 9 to rotate and the associated parts to interact. This last step is shown in cross-section in FIG. 4Q. The final product, the gas-driven microturbine and its core propulsion components, is shown in top view in FIGS. 1, 2, and 3, as previously described.

While the preferred embodiment of the invention has been disclosed with reference to a number of methods for the fabrication of microstructures, it is to be understood that many changes in detail may be made as a matter of engineering choices and specific applications without departing from the spirit and scope of the invention.

What is claimed is:

1. A gas-driven microturbine developed using a polysilicon surface-micromachining batch-fabricated technique comprising:

a substrate base;

a holding tank formed on said substrate base;

a fuel delivery system formed on said substrate base further comprising at least one inlet tube for transporting a fuel set from said holding tank to a reaction chamber;

a reaction chamber formed on said substrate base, further comprising a means for heating said fuel set;

a flow channel formed on said substrate base extending from said reaction chamber and protruding into a turbine housing;

a turbine housing formed on said substrate base in which said flow channel receives a high-flow gas stream generated in said reaction chamber by heating of said fuel set to drive a turbine;

a turbine contained within said turbine housing and made rotatably secured by a central turbine hub formed on and attached to said substrate base;

a mechanical linkage arm formed on said substrate base and attached to said turbine by a pin joint, wherein rotational motion from said turbine induces linear motion on said mechanical linkage arm;

a mechanical load formed on said substrate and located in close proximity to said turbine housing wherein said mechanical load is attached to said mechanical linkage arm;

an exhaust port means formed on said substrate base extending from said turbine housing.

2. The gas-driven microturbine of claim 1, wherein said substrate base is comprised of single crystal silicon material.

3. The gas-driven microturbine of claim 1, further comprising a pre-heater element positioned between said at least one inlet tube and said reaction chamber.

4. The gas-driven microturbine of claim 1, wherein said mechanical load comprises an actuated element.

5. The gas-driven microturbine of claim 1, wherein said holding tank, said fuel delivery system comprising said at least one inlet tube, said reaction chamber, said flow channel, said turbine housing, said turbine hub, said turbine, said mechanical linkage arm, said actuated element, and said exhaust port, are batch-fabricated from a polysilicon material formed using polysilicon surface-micromachining of multiple polysilicon films with interleaving sacrificial oxide films.

6. The gas-driven microturbine of claim 1, wherein said fuel set is directly injected into said holding tank.

7. The gas-driven microturbine of claim 6, wherein said fuel set provided to said reaction chamber by said fuel delivery system comprises water.

8. The gas-driven microturbine of claim 6, wherein said fuel set provided to said reaction chamber by said fuel delivery system comprises compressed gas.

9. The gas-driven microturbine of claim 6, wherein said fuel set provided to said reaction chamber by said fuel delivery system comprises the class of monopropellants.

10. The gas-driven microturbine of claim 6, wherein said fuel set provided to said reaction chamber by said fuel delivery system comprises the class of bipropellants.

11. The gas-driven microturbine of claim 1, wherein said flow channel provides an exit for the high-flow gas stream from said reaction chamber.

12. The gas-driven microturbine of claim 5, wherein said means for transporting said fuel set from said holding tank to said reaction chamber by said fuel delivery system is accomplished by capillary action forces in the microdomain.

13. The gas-driven microturbine of claim 1, wherein said flow channel is located in a path directly orthogonal to a turbine blade of said turbine in said turbine housing.

14. The gas-driven microturbine of claim 1, wherein said means for heating said fuel set comprises a plurality of thermal assist filaments made of polysilicon material and arranged in parallel in said reaction chamber.

15. The gas-driven microturbine of claim 14, wherein said thermal assist filaments are powered from an external source up to an operating temperature of 1100° C.

16. The gas-driven microturbine of claim 1, wherein a high-flow gas stream produced within said reaction chamber enters said flow channel and said turbine housing, inducing linear motion on said mechanical linkage arm and causing said connected actuated element to generate electrical power and wherein said high-flow gas stream escapes through said exhaust port to ambient.

17. A three-level polysilicon surface-micromachining batch-fabrication process for developing a gas-driven microturbine having core propulsion components including turbine housing, rotatable turbine including turbine blades and central turbine hub, fuel delivery system, fuel lines, holding tank, means for heating a fuel set, reaction chamber, flow channels, exhaust port, and a mechanical linearly-movable actuated element, said process comprising the steps of:

providing a silicon substrate base in a plane;

providing on said substrate base an oxide layer and a nitride layer to form an insulation layer;

patterning said insulation layer and etching said oxide layer with an etch mask to form at least one full-depth cut into said substrate base, said at least one fill-depth cut acting as an electrical interconnect;

providing on said insulation layer a first layer of polysilicon (POLY 0) to form a voltage reference and an electrical interconnect plane;

depositing a photoresist material over said first polysilicon layer;

patterning said layer by exposing the photoresist material to ultraviolet light through a photoresist mask to make it susceptible to a developer;

removing areas of the exposed photoresist material made susceptible to the developer by applying ultraviolet light to the exposed photoresist material and then cleaning the layered substrate base to remove excess material;

etching the patterned first polysilicon layer by reactive ion etching to define the base portions of a turbine housing fixed to and extending above said substrate;

providing a layer of oxide to form a first sacrificial layer;

depositing a layer of photoresist material on the first sacrificial layer;

patterning the first sacrificial layer by exposing the photoresist material to ultraviolet light through a photoresist mask to make it susceptible to a developer;

removing areas of the exposed photoresist material made susceptible to the developer by applying ultraviolet light to, the exposed photoresist material and then cleaning the layered substrate base to remove excess material;

etching to form partial-depth cuts (dimples) into said sacrificial layer;

providing a low-stress silicon nitride layer;

depositing a layer of photoresist material on the low-stress nitride layer;

patterning the nitride layer by exposing the photoresist material to ultraviolet light through a photoresist mask to make it susceptible to a developer;

removing areas of the exposed photoresist material made susceptible to the developer by applying ultraviolet light to the exposed photoresist material and then cleaning the layered substrate base to remove excess material;

etching to form stator-to-substrate anchor areas for subsequent polysilicon deposition;

providing a second layer of polysilicon (POLY 1) for fabricating an initial layout of structural components of the gas-driven microturbine comprising the holding tank, reaction chamber, mechanical linkage arm, turbine housing, turbine shroud, turbine hub, exhaust port and mechanical linkage arm;

depositing a layer of said photoresist material on the POLY 1 layer;

patterning the POLY 1 layer by exposing the photoresist material to ultraviolet light through a photoresist mask to make it susceptible to a developer;

removing areas of the exposed photoresist material made susceptible to the developer by applying ultraviolet light to the exposed photoresist material and then cleaning the layered substrate base to remove excess material;

etching to form full-depth cuts into said POLY 1 layer;

undercutting said POLY 1 layer to form pin joint cavities;

backfilling said full-depth cuts and pin joint cavities with an oxide followed by annealing the layered substrate base in nitrogen;

providing a low-stress silicon nitride layer to form a friction-reduction layer;

depositing a layer of photoresist material on the low-stress silicon nitride layer;

patterning the low-stress silicon nitride layer by exposing the photoresist material to ultraviolet light through a photoresist mask to make it susceptible to a developer;

removing areas of the exposed photoresist material made susceptible to the developer by applying ultraviolet light to the exposed photoresist material and then cleaning the layered substrate base to remove excess material;

etching to remove backfill oxide from the pin joint cavities, to form pin joint connections, and to form anchor areas for connecting to the POLY 1 layer;

providing a third layer of polysilicon deposition (POLY 2) for fabricating a second structural layer of the gas-driven microturbine, comprising a turbine and turbine blades;

depositing a layer of photoresist material on the POLY 2 layer;

patterning the POLY 2 layer by exposing the photoresist material to ultraviolet light through a photoresist mask to make it susceptible to a developer;

removing areas of the exposed photoresist material made susceptible to the developer by applying ultraviolet light to the exposed photoresist material and then cleaning the layered substrate base to remove excess material;

etching to form the turbine and individual turbine blades;

providing a third layer of oxide to form a third sacrificial layer;

depositing a layer of photoresist material on the third sacrificial layer;

patterning the third sacrificial layer by exposing the photoresist material to ultraviolet light through a photoresist mask to make it susceptible to a developer;

removing areas of the exposed photoresist material made susceptible to the developer by applying ultraviolet light to the exposed photoresist material and then cleaning the layered substrate base to remove excess material;

etching to form partial-depth cuts in the third sacrificial layer;

etching to create full-depth cuts areas through the third sacrificial layer to form anchor areas for connecting subsequent depositions to the POLY 2 layer and for anchoring the POLY 2 level to said substrate base, to form a fuel delivery system comprising at least one inlet tube, and to further refine the turbine housing, turbine shroud, turbine, pin joints, mechanical linkage arm reaction chamber, and exhaust port;

providing a fourth layer of polysilicon deposition (POLY 3) for fabricating a third and final structural layer;

annealing the substrate base and POLY 3, POLY 2, and POLY 1 levels in nitrogen to ensure that said polysilicon mechanical films do not exhibit undesired internal stress which would cause deformation of the final structural layer;

depositing a layer of photoresist material on the POLY 3 layer;

patterning the POLY 3 layer by exposing the photoresist material to ultraviolet light through a photoresist mask to make it susceptible to a developer;

removing areas of the exposed photoresist material made susceptible to the developer by applying ultraviolet light to the exposed photoresist material and then cleaning the layered substrate base to a hydrofluoric acid dip to remove excess material;

etching to form and to complete fabrication of the mechanical linkage arm, holding tank, delivery system comprising said at least one inlet tube, reaction chamber, turbine shroud, exhaust port, and actuated element;

performing a final release etch of gas-driven microturbine structure to produce free-standing micropropulsion components and to allow rotatable elements to rotate and linearly movable elements to perform linear movement.

* * * * *